(12) United States Patent
Matsunada

(10) Patent No.: US 8,279,882 B2
(45) Date of Patent: Oct. 2, 2012

(54) COMPUTER-READABLE STORAGE MEDIUM HAVING STORED THEREIN MOBILE TERMINAL PROGRAM, MOBILE TERMINAL DEVICE, AND SYSTEM

(75) Inventor: Takuma Matsunada, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 242 days.

(21) Appl. No.: 12/723,828

(22) Filed: Mar. 15, 2010

(65) Prior Publication Data
US 2011/0176455 A1    Jul. 21, 2011

(30) Foreign Application Priority Data
Jan. 15, 2010   (JP) .................................. 2010-006799

(51) Int. Cl.
*H04L 12/28* (2006.01)
(52) U.S. Cl. ...................... 370/401; 370/338; 455/456.1
(58) Field of Classification Search ................. 455/456.1
See application file for complete search history.

(56) References Cited

U.S. PATENT DOCUMENTS

| | | | | |
|---|---|---|---|---|
| 2007/0121560 | A1* | 5/2007 | Edge | 370/338 |
| 2008/0261620 | A1* | 10/2008 | Rekimoto | 455/456.1 |
| 2010/0088407 | A1* | 4/2010 | Fukui et al. | 709/224 |

FOREIGN PATENT DOCUMENTS

JP    2009-171365    7/2009

* cited by examiner

*Primary Examiner* — Duc C Ho
(74) *Attorney, Agent, or Firm* — Nixon & Vanderhye, P.C.

(57) ABSTRACT

A location information provision system includes an access point, a first game apparatus, and a second game apparatus. The access point stores information for specifying a current location of the access point, and transmits the information to the first game apparatus. The first game apparatus IB receives the information transmitted from the access point, and specifies the location of the access point based on the information. The first game apparatus transmits location information representing the specified location to the second game apparatus. The second game apparatus receives the location information transmitted from the first game apparatus, and specifies the current location of the second game apparatus based on the received location information.

20 Claims, 15 Drawing Sheets

FIG. 7A

TERMINAL BEACON FRAME

| F_TYP | SOURCE MAC ADDRESS | ELAPSED-TIME INFORMATION (ACQUISITION TIME INFORMATION AND VALID TIME INFORMATION) | D1 |
|---|---|---|---|

FIG. 7B

COMMUNICATION PERMISSION FRAME

| F_TYP | DESTINATION MAC ADDRESS | SOURCE MAC ADDRESS | RESULT INFORMATION | COMMUNICATION INFORMATION | D2 |
|---|---|---|---|---|---|

FIG. 7C

LOCATION INFORMATION FRAME

| F_TYP | DESTINATION MAC ADDRESS | SOURCE MAC ADDRESS | LOCATION INFORMATION | AP IDENTIFICATION INFORMATION | ELAPSED-TIME INFORMATION (ACQUISITION TIME INFORMATION AND VALID TIME INFORMATION) | D3 |
|---|---|---|---|---|---|---|

FIG. 7D

COMMUNICATION REQUEST FRAME

| F_TYP | DESTINATION MAC ADDRESS | SOURCE MAC ADDRESS | D4 |
|---|---|---|---|

FIG. 7E

LOCATION INFORMATION REQUEST FRAME

| F_TYP | DESTINATION MAC ADDRESS | SOURCE MAC ADDRESS | D5 |
|---|---|---|---|

FIG. 7F

AP BEACON FRAME

| F_TYP | BSSID | ESSID | SECURITY INFORMATION | RSSI | CHANNEL INFORMATION | D6 |
|---|---|---|---|---|---|---|

FIG. 8A
LOCATION DATA (AP LOCATION DATA)

| LOCATION INFORMATION | AP IDENTIFICATION INFORMATION | ELAPSED-TIME INFORMATION (ACQUISITION TIME INFORMATION AND VALID TIME INFORMATION) |
|---|---|---|

D7(D7a),D8

FIG. 8B
LOCATION DATA (TERMINAL LOCATION DATA)

| LOCATION INFORMATION | AP IDENTIFICATION INFORMATION | ELAPSED-TIME INFORMATION (ACQUISITION TIME INFORMATION AND VALID TIME INFORMATION) | OTHER-GAME-APPARATUS-DERIVED INFORMATION |
|---|---|---|---|

D7(D7b),D8

FIG. 8C
LOCATION INFORMATION TABLE

| BSSID | LOCATION INFORMATION |
|---|---|
| BSSID_1 | LOCATION INFORMATION _1 |
| BSSID_2 | LOCATION INFORMATION _2 |
| BSSID_3 | LOCATION INFORMATION _3 |

T1

FIG. 8D
AP IDENTIFICATION INFORMATION TABLE

| ESSID | AP IDENTIFICATION INFORMATION |
|---|---|
| ESSID_1 | HIGH-RELIABILITY AP |
| ESSID_2 | LOW-RELIABILITY AP |
| ESSID_3 | LOW-RELIABILITY AP |

T2

COMPUTER-READABLE STORAGE MEDIUM HAVING STORED THEREIN MOBILE TERMINAL PROGRAM, MOBILE TERMINAL DEVICE, AND SYSTEM

CROSS REFERENCE TO RELATED APPLICATION

The disclosure of Japanese Patent Application No. 2010-6799, filed on Jan. 15, 2010, is incorporated herein by reference.

BACKGROUND OF THE INVENTION

1. Field of the Invention

The present invention relates to a computer-readable storage medium having stored therein a mobile terminal program, a mobile terminal device, and a system, and particularly to a mobile terminal program for specifying the current location of a mobile terminal device, a mobile terminal device, and a system using the mobile terminal device.

2. Description of the Background Art

Conventionally, there is a system for providing a mobile terminal device with location information representing the current location of the mobile terminal device. In this system, location information is distributed by an access point by wireless communication, and the mobile terminal device receives the location information, and therefore can be provided with the location information (Japanese Laid-Open Patent Publication No. 2009-171365, for example). The method of thus distributing location information from an access point to a mobile terminal device has the advantage that even in an environment where location information cannot be measured by a GPS or the like (e.g., indoors or underground), the provision of an access point in the environment makes it possible to provide a mobile terminal device with location information.

However, in the conventional system, the mobile terminal device cannot acquire location information if the mobile terminal device is not located within the accessible range of radio waves of the access point. Thus in the conventional system, the mobile terminal device can be provided with location information only in the case where the mobile terminal device is located within the accessible range of radio waves of the access point, and such a location (range) is extremely limited.

Normally, the access point is provided in a fixed manner so as not to be moved, and therefore the accessible range of radio waves of the access point is also fixed. Thus the state where a mobile terminal device can acquire location information is also fixed, and is not varied.

SUMMARY OF THE INVENTION

Thus an object of the present invention is to expand the range where a mobile terminal device can be provided with location information, and to add variety to the state where a mobile terminal device can be provided with location information.

A program according to a first aspect causes a computer of a mobile terminal device to function as first communication means, first location information acquisition means, and current location specifying means. The first communication means communicates with at least one other mobile terminal device. The first location information acquisition means communicates with the other mobile terminal device using the first communication means to thereby acquire first location information representing a location of the other mobile terminal device from the other mobile terminal device. The current location specifying means for specifying a current location of the mobile terminal device based on the first location information. Note that the program is stored in a given computer-readable storage medium (e.g. a flexible disk, a hard disk, an optical disk, a magneto-optical disk, a CD-ROM, a CD-R, a magnetic tape, a non-volatile semiconductor memory card, a ROM, or a RAM).

With this structure, the mobile terminal device communicates with the other mobile terminal device to thereby acquire the first location information representing the location of the other mobile terminal device. When the mobile terminal device can communicate with the other mobile terminal device, it is considered that, for example, the other mobile terminal device is located so near to the mobile terminal device as to communicate with the mobile terminal device. Thus the first location information represents the current location of the other mobile terminal device located so near to the mobile terminal device as to communicate with the mobile terminal device, and therefore the current location specifying means can specify the location information about the mobile terminal device using the first location information.

As described above, the mobile terminal device communicates with the other mobile terminal device, and therefore can be provided with location information to be used to specify the current location of the mobile terminal device. The number of the other mobile terminal devices with which the mobile terminal device can communicate will increase with the proliferation of the device, and therefore it is possible, with the proliferation of the device, to expand the range where the mobile terminal device can be provided with location information. In addition, the other mobile terminal device travels in accordance with the movement of the user of the other mobile terminal device. Thus it is possible to add variety to the state where the mobile terminal device can be provided with location information.

In a second aspect, the program further causes the computer to function as second location information acquisition means. The information acquisition means acquires second location information related to the current location of the mobile terminal device. The current location specifying means specifies the current location of the mobile terminal device based on at least one of the first location information and the second location information. The second location information is, for example, location information input by the user using input means of the mobile terminal device, or location information acquired by communicating with a device other than the other mobile terminal device. With this structure, it is possible to specify the current location of the mobile terminal device using, of the first location information acquired from the other mobile terminal device and the second location information, the more appropriate location information, or both the first location information and the second location information, and therefore it is possible to specify the current location with increased accuracy. Alternatively, it is also possible to specify the location of the mobile terminal device if either one of the first location information and the second location information has been acquired.

In a third aspect, the program further causes the computer to function as second communication means for communicating with at least one fixed station that is provided in a fixed manner. The second location information acquisition means communicates with the fixed station using the second communication means to thereby acquire information representing a location of the fixed station, as the second location information. With this structure, the second location information is acquired by communicating with the fixed station. The fixed station is provided in a fixed manner, and is not easily moved, and therefore the location information about the fixed station is fixed. Thus the second location information is likely to accurately represent the location of the fixed station. Thus it is possible, using the second location information, to specify the location information about the mobile terminal device with improved accuracy.

In a fourth aspect, the other mobile terminal device communicates with the fixed station or another fixed station to thereby acquire location information, and the first location information acquisition means acquires the location information from the other mobile terminal device as the first location information. Thus the first location information acquired from the other mobile terminal device is location information acquired when the other mobile terminal device has communicated with the fixed station, and therefore is likely to represent the location of the other mobile terminal device more accurately than location information input by a user and the like. Thus it is possible to specify the location information about the mobile terminal device with improved accuracy.

In a fifth aspect, when the second location information acquisition means has acquired the second location information, the current location specifying means specifies the current location of the mobile terminal device based on the second location information acquired by the second location information acquisition means, regardless of whether or not the first location information acquisition means has acquired the first location information. Further, in a sixth aspect, when the second location information acquisition means has not acquired the second location information and when the first location information acquisition means has acquired the first location information, the current location specifying means specifies the current location of the mobile terminal device based on the first location information As described above, the fixed station is provided in a fixed manner, and is not easily moved, and therefore the location information about the fixed station is fixed. Thus the second location information is likely to accurately represent the location of the fixed station. Thus it is possible, using the second location information in priority to the first location information, to specify the location information about the mobile terminal device with improved accuracy.

In a seventh aspect, the program causes the computer to function as a timer and invalidation means. The timer times at least one of time elapsed since the first location information acquisition means has acquired the first location information and time elapsed since the second location information acquisition means has acquired the second location information. The invalidation means invalidates, when the at least one of the times timed by the timer has reached a predetermined period of time, the corresponding one of the first location information and the second location information, since whose acquisition the predetermined period of time has elapsed. With this structure, it is possible to invalidate location information that has expired. The mobile terminal device is carried by the user and travels in accordance with the movement of the user, and therefore location information that has been acquired a long time ago is not likely to represent the location information about the mobile terminal device even if the location information is specified to represent the location of the mobile terminal device. Thus the invalidation of such location information prevents inaccurate location information from continuing to be specified to represent the location of the mobile terminal device.

In an eighth aspect, the first location information acquisition means stores the acquired first location information in a storage means of the mobile terminal device for a predetermined period of time. The current location specifying means specifies the current location of the mobile terminal device based on one of the first location information satisfying predetermined conditions including a condition that the number of pieces of the first location information stored in the storage means is equal to or greater than a predetermined number, and the second location information. The mobile terminal device travels while carried by the user, and therefore it is unlikely that the first location information represents the current location of the source of the location information more accurately than the second location information acquired by communicating with the fixed station. With this structure, only when equal to or greater than a predetermined number of pieces of first location information are stored in the storage means, these pieces of location information are used to specify the location information representing the current location of the mobile terminal device, and therefore it is possible, even using the first location information, to specify the current location with improved accuracy.

In a ninth aspect, the first communication means communicates with the at least one other mobile terminal device by Near Field Communication. Further, in a tenth aspect, the first location information acquisition means automatically acquires the first location information from the other mobile terminal device. In an eleventh aspect, the second location information acquisition means automatically acquires the second location information from the other mobile terminal device.

In a twelfth aspect, the fixed station is an access point. In a thirteenth aspect, the program further causes the computer to function as changing means for changing the predetermined number. In a fourteenth aspect, the program further causing the computer to function as storage control means for storing in the storage means the number of times the first location information acquisition means has acquired the first location information from the other mobile terminal device, and the changing means changes the predetermined number based on the number of times stored by the storage control means.

A system according to a fifteenth aspect is a system, including at least a mobile terminal device, for specifying a current location of the mobile terminal device. To achieve the above object, the system includes first communication means, first location information acquisition means, and current location specifying means. The first communication means communicates with at least one other mobile terminal device. The first location information acquisition means communicates with the other mobile terminal device using the first communication means to thereby acquire first location information representing a location of the other mobile terminal device from the other mobile terminal device. The current location specifying means specifies the current location of the mobile terminal device based on the first location information. Note that in the present invention, a "system" may include a single device or a plurality of devices. For example, the system may include only a mobile terminal device, and the mobile terminal device may include the first communication means, the first location information acquisition means, and the current location specifying means. Alternatively, the system may include a server and a mobile terminal device, and the server may include some of the first communication means, the first location information acquisition means, and the current location specifying means, and the mobile terminal device may include the rest.

To achieve the above object, a method according to a sixteenth aspect is a method of specifying a current location of a mobile terminal device. In this method, the step is performed of communicating with at least one other mobile terminal device to thereby acquire first location information representing a location of the other mobile terminal device from the other mobile terminal device. The step is performed of specifying the current location of the mobile terminal device based on the first location information.

A system according to a seventeenth aspect is a system including a fixed station provided in a fixed manner, a first mobile terminal device, and a second mobile terminal device. To achieve the above object, the fixed station includes first storage means and first transmission means. The first storage means stores therein information for specifying a current location of the fixed station. The first transmission means transmits the stored information to the first mobile terminal device. The first mobile terminal device includes first reception means, fixed station location specifying means, and second transmission means. The first reception means receives the information transmitted from the first transmission means. The fixed station location specifying means specifies a location of the fixed station based on the information received by the first reception means. The second transmission means transmits, to the second mobile terminal device, location information representing the location specified by the fixed station location specifying means. The second mobile terminal device includes second reception means and current location specifying means. The second reception means receives the location information transmitted from the second transmission means. The current location specifying means specifies a current location of the second mobile terminal device based on the location information received by the second reception means.

In an eighteenth aspect, the information for specifying the current location of the fixed station includes identification information specific to the fixed station. The first mobile terminal device further includes second storage means for storing therein location information associated with the identification information. The fixed station location specifying means reads from the second storage means the location information associated with the identification information included in the information received by the first reception means, and specifies the location of the fixed station based on the read location information.

According to the present invention, the mobile terminal device can acquire location information from the other mobile terminal device. The number of the other mobile terminal devices with which the mobile terminal device can communicate will increase with the proliferation of the device. Thus it is possible, with the proliferation of the device, to expand the range where the mobile terminal device can be provided with location information.

In addition, the other mobile terminal device travels in accordance with the movement of the user of the other mobile terminal device. Thus it is possible to add variety to the state where the mobile terminal device can be provided with location information.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7A is a diagram showing an example of the frame structure of a terminal beacon frame D1;

FIG. 7B is a diagram showing an example of the frame structure of a communication permission frame D2;

FIG. 7C is a diagram showing an example of the frame structure of a location information frame D3;

FIG. 7D is a diagram showing an example of the frame structure of a communication request frame D4;

FIG. 7E is a diagram showing an example of the frame structure of a location information request frame D5;

FIG. 7F is a diagram showing an example of the frame structure of an AP beacon frame D6;

FIG. 8A is a diagram showing location data D7 including location information provided by an access point 2;

FIG. 8B is a diagram showing location data D7 including location information provided by said another game apparatus;

FIG. 8C is a diagram showing an example of a location information table T1;

FIG. 8D is a diagram showing an example of an AP identification information table T2;

DESCRIPTION OF THE PREFERRED EMBODIMENTS (First Embodiment)

Figure 1:
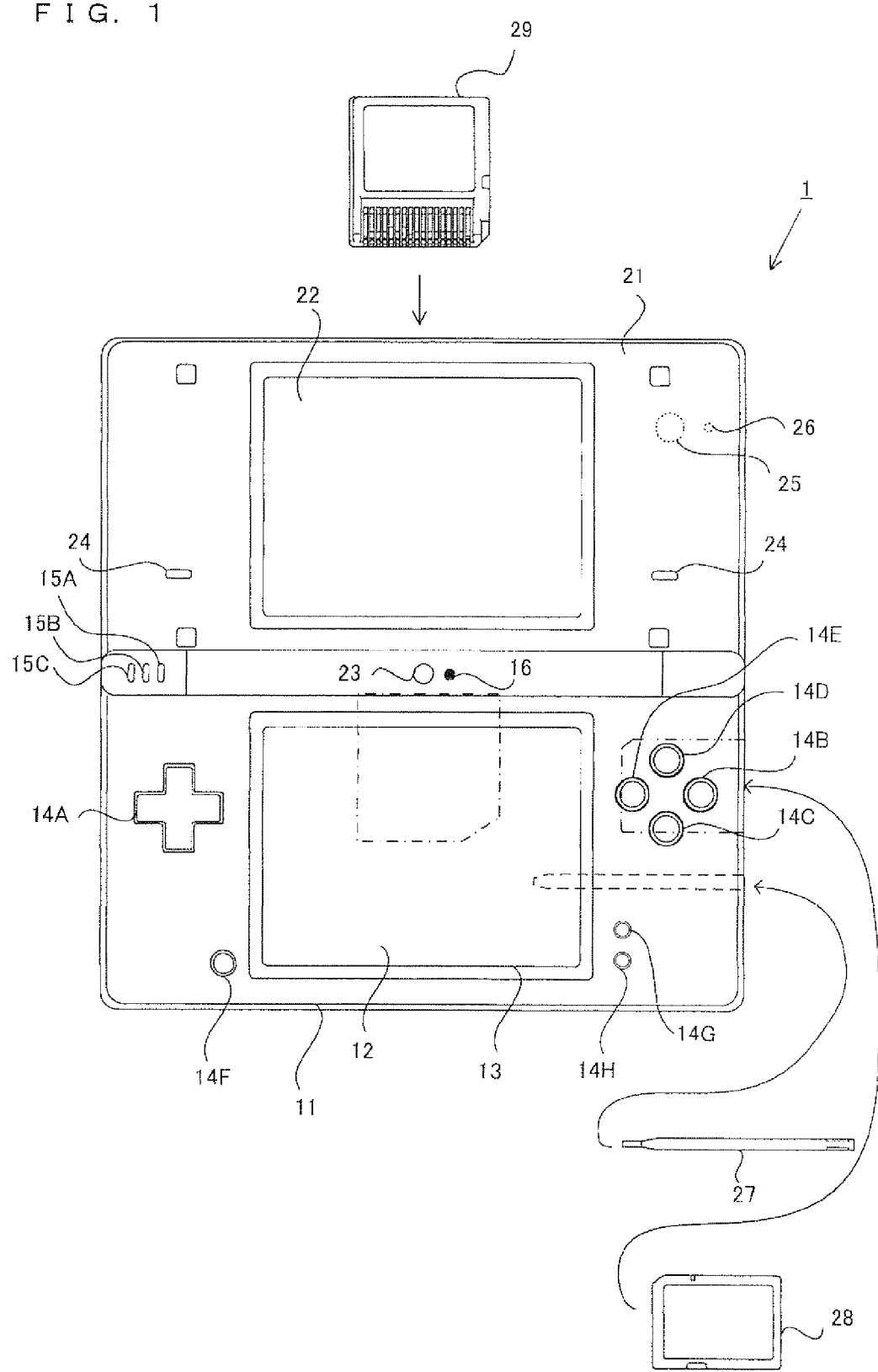
FIG. 1 is an external view of a game apparatus included in a location information provision system according to a first embodiment.
Figure 2:
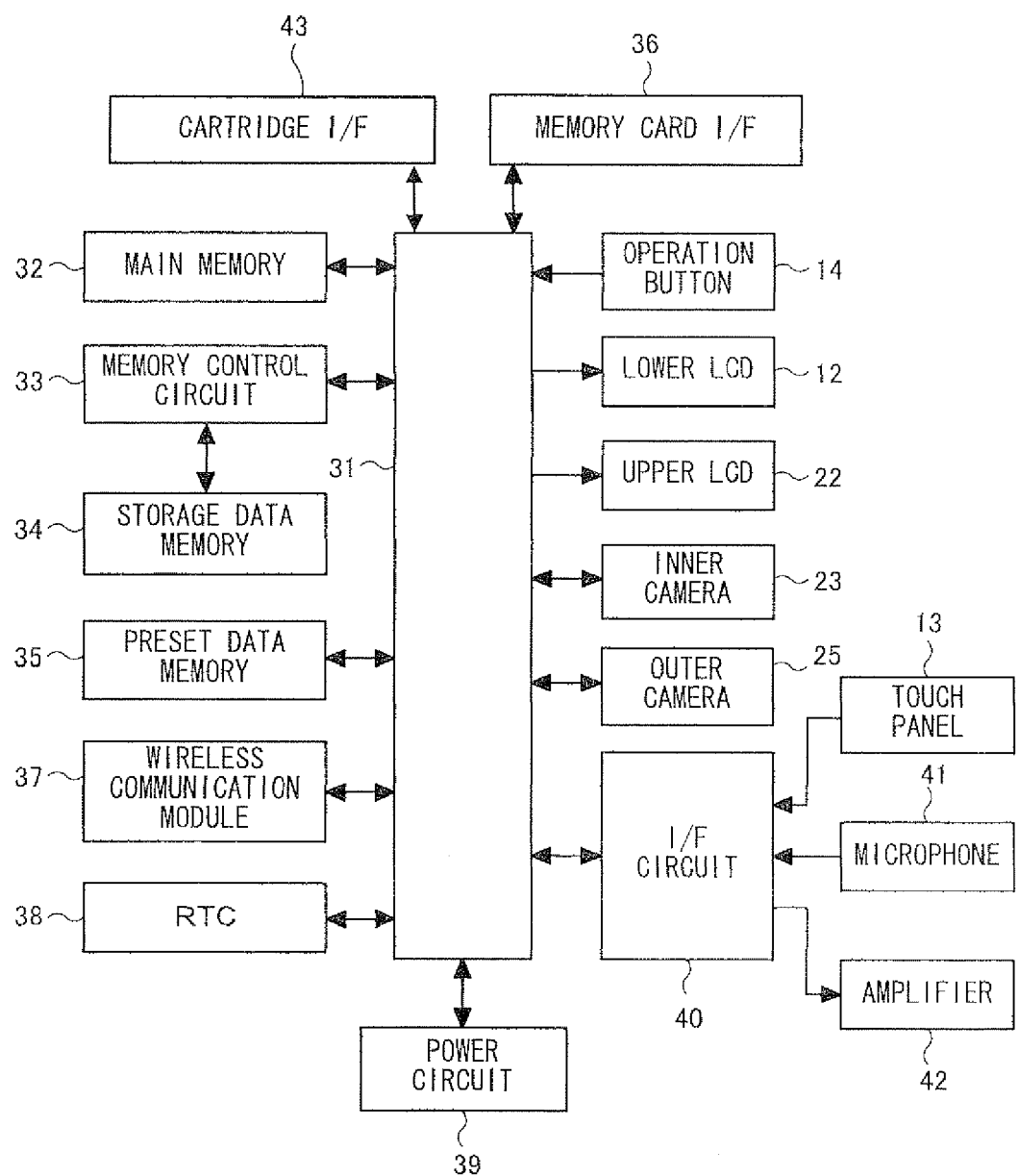
FIG. 2 is a block diagram showing an example of the internal structure of a game apparatus 1.

With reference to the drawings, a description is given below of a location information provision system according to a first embodiment of the present invention. In the location information provision system, a hand-held game apparatus (corresponding to a mobile terminal device according to the present invention) is provided with information (location information) representing the location (current location) where the game apparatus is present. The location information is provided by another hand-held game apparatus that is the same in structure as the game apparatus, and by an access point. Note that in the present embodiment, the game apparatus and said another game apparatus are the same in structure, but may be of the same type but slightly different in structure. With reference to FIGS. 1 and 2, a description is given below of the structure of the game apparatus included in the location information provision system.

FIG. 1 is an external view of the game apparatus included in the location information provision system according to the first embodiment. The game apparatus executes a mobile terminal program according to the present invention to thereby function as a mobile terminal device according to the present invention.

Referring to FIG. 1, a game apparatus 1 is a foldable hand-held game apparatus, and is open (in an open state). The game apparatus 1 is of a size that allows a user to hold it with one hand or both hands even in the open state.

The game apparatus 1 includes a lower housing 11 and an upper housing 21. The lower housing 11 and the upper housing 21 are connected to each other by hinge so that the game apparatus 1 is openable and closable in a folding manner (foldable). In the example of FIG. 1, the lower housing 11 and the upper housing 21 each have a wider-than-high rectangular plate shape, and one long side of the lower housing 11 and one long side of the upper housing 21 are rotatably connected to each other. Normally, the user uses the game apparatus 1 in the open state. On the other hand, the user stores away the game apparatus 1 in a closed state when not using it. Additionally, in the example of FIG. 1, as well as the closed state and the open state that are described above, the game apparatus 1 can maintain the lower housing 11 and the upper housing 21 at any angle formed between the housings in the closed state and the housings in the open state, due to a frictional force generated at the connecting part and the like. That is, the upper housing 21 can be maintained stationary at any angle with respect to the lower housing 11.

The lower housing 11 includes a lower LCD (Liquid Crystal Display) 12. The lower LCD 12 has a wider-than-high shape, and is located so that the direction along the long side of the lower LCD 12 coincides with the direction along the long side of the lower housing 11. In the present embodiment, an LCD is used as a display device included in the game apparatus 1; however, any other display device such as a display device employing EL (Electro-luminescence) may be used. In addition, a display device having any resolution may be used for the game apparatus 1. Note that although described in detail later, the lower LCD 12 is mainly used to display in real time an image that is being captured by an inner camera 23 or an outer camera 25.

The lower housing 11 includes operation buttons 14A through 14K and a touch panel 13 as input devices. As shown in FIG. 1, among the operation buttons 14A through 14K, the direction input button 14A, the operation button 14B, the operation button 14C, the operation button 14D, the operation button 14E, the power button 14F, the start button 14G, and the select button 14H are provided on the inner main surface of the lower housing 11, the inner main surface being located inside the game apparatus 1 when the game apparatus 1 is folded. The direction input button 14A is used for, for example, a selection operation. The operation buttons 14B through 14E are used for, for example, a determination operation or a cancel operation. The power button 14F is used to power on/off the game apparatus 1. In the example of FIG. 1, the direction input button 14A and the power button 14F are provided on the inner main surface of the lower housing 11 and to one of the right and the left (to the left in FIG. 1) of the lower LCD 12, provided around the center of the inner main surface. The operation buttons 14B through 14E, the start button 14G, and the select button 14H are provided on the inner main surface of the lower housing 11 and to the other one of the right and the left (to the right in FIG. 1) of the lower LCD 12. The direction input button 14A, the operation buttons 143 through 14E, the start button 14G, and the select button 14H are used to perform various operations on the game apparatus 1.

Note that the operation buttons 14I through 14K are not shown in FIG. 1. For example, the L button 14I is provided at the left end of the upper side surface of the lower housing 11. The R button NJ is provided at the right end of the upper side surface of the lower housing 11. The L button 14I and the R button 14J are used to perform, for example, a capturing instruction operation (a shutter operation) on the game apparatus 1. In addition, the volume button 14K is provided on the left side surface of the lower housing 11. The volume button 14K is used to adjust the volume of speakers included in the game apparatus 1.

The game apparatus 1 further includes the touch panel 13 as an input device other than the operation buttons 14A through 14K. The touch panel 13 is mounted so as to cover the screen of the lower LCD 12. In the present embodiment, for example, a resistive touch panel is used as the touch panel 13. As the touch panel 13, however, not only a resistive touch panel but also any pressure-type touch panel may be used. In the present embodiment, the touch panel 13 has, for example, the same resolution (detection accuracy) as that of the lower LCD 12. The resolutions of the touch panel 13 and the lower LCD 12, however, do not necessarily need to be the same. Additionally, on the right side surface of the lower housing 11, an opening (a dashed line shown in FIG. 1) is provided. The opening can accommodate a stylus 27 that is used to perform an operation on the touch panel 13. Normally, an input is provided to the touch panel 13 using the stylus 27. The touch panel 13, however, can be operated not only by the stylus 27 but also by a finger of the user.

On the right side surface of the lower housing 11, an insertion slot (a dashed double-dotted line in FIG. 1) is provided for accommodating a memory card 28. Inside the insertion slot, a connector (not shown) is provided for electrically connecting the game apparatus 1 and the memory card 28. The memory card 28 is, for example, an SD (Secure Digital) memory card, and is detachably attached to the connector. The memory card 28 is used to, for example, store (save) therein an image captured by the game apparatus 1 or load an image generated by another device into the game apparatus 1.

On the upper side surface of the lower housing 11, an insertion slot (a dashed dotted line in FIG. 1) is provided for accommodating a cartridge 29. Also inside the insertion slot, a connector (not shown) is provided for electrically connecting the game apparatus 1 and the cartridge 29. The cartridge 29 is a storage medium having stored therein a game program or the like, and is detachably inserted into the insertion slot provided in the lower housing 11.

At the left of the connecting part between the lower housing 11 and the upper housing 21, three LEDs 15A through 15C are provided. Here, the game apparatus 1 can wirelessly communicate with another device. The first LED 15A is lit when the power to the game apparatus 1 is on. The second LED 15B is lit while the game apparatus 1 is being charged. The third LED 15C is lit when wireless communication is established. Thus the three LEDs 15A through 15C can notify the user of the on/off status of the power to the game apparatus 1, the state of the charge, and the state of the establishment of communication.

On the other hand, the upper housing 21 includes an upper LCD 22. The upper LCD 22 has a wider-than-high shape, and is located so that the direction along the long side of the upper LCD 22 coincides with the direction along the long side of the upper housing 21. Note that as in the lower LCD 12, a display device employing any other method and having any resolution may be used instead of the upper LCD 22. Note that a touch panel may be provided so as to cover the upper LCD 22. On the upper LCD 22, for example, an operation instruction screen is displayed to inform the user of the functions of the operation buttons 14A through 14K and the touch panel 13.

The upper housing 21 includes two cameras (an inner camera 23 and an outer camera 25). As shown in FIG. 1, the inner camera 23 is provided on the inner main surface of the upper housing 21 around the connecting part. On the other hand, the outer camera 25 is provided on the surface opposite to the inner main surface, of the upper housing 21, on which the inner camera 23 is provided. That is, the outer camera 25 is provided on the outer main surface (which faces outward when the game apparatus 1 is closed and which corresponds to the back surface of the upper housing 21 shown in FIG. 1) of the upper housing 21. In FIG. 1, the outer camera 25 is shown by a dotted line. Thus the inner camera 23 can perform capturing in the direction that the inner main surface of the upper housing 21 faces, and the outer camera 25 can perform capturing in the direction opposite to the capturing direction of the inner camera 23, i.e., in the direction that the outer main surface of the upper housing 21 faces. Thus in the present embodiment, two cameras, i.e., the inner camera 23 and the outer camera 25, are provided so as to have the capturing directions opposite to each other. For example, the user can capture a view seen in the direction from the game apparatus 1 to the user, using the inner camera 23, and can also capture a view seen in the direction from the game apparatus 1 to the direction opposite to the user, using the outer camera 25.

On the inner main surface around the connecting part, a microphone (a microphone 41 shown in FIG. 2) is provided as an audio input device. Further on the inner main surface around the connecting part, a microphone hole 16 is formed so as to detect a sound from outside the game apparatus 1. The microphone 41 and the microphone hole 16 do not necessarily need to be located at the connecting part. For example, the microphone 41 may be provided in the lower housing 11, and the microphone hole 16 may be provided in the lower housing 11 so as to correspond to the position of the microphone 41.

On the outer main surface of the upper housing 21, a fourth LED 26 (a dotted line in FIG. 1) is provided. The fourth LED 26 is lit when capturing has been performed by the outer camera 25 (when a shutter button has been pressed). In addition, the fourth LED 26 is lit while a moving image is being captured by the outer camera 25. The fourth LED 26 can notify a person to be captured or a person around the person to be captured that capturing has been performed (is being performed) by the game apparatus 1.

On the inner main surface of the upper housing 21, sound holes 24 are formed to the right and left, respectively, of the upper LCD 22, provided around the center of the inner main surface. In the upper housing 21, speakers are provided at the back of the sound holes 24. The sound holes 24 are provided so as to release a sound output from the speakers to the outside of the game apparatus 1.

As described above, the upper housing 21 includes the inner camera 23 and the outer camera 25 for capturing an image, and also includes the upper LCD 22, which is display means for displaying, for example, an operation instruction screen when capturing is performed. On the other hand, the lower housing 11 includes the input devices (the touch panel 13 and the buttons 14A through 14K) for providing an operation input to the game apparatus 1, and also includes the lower LCD 12, which is display means for displaying a game screen. Thus, when using the game apparatus 1, the user can provide an input to the input devices, holding the lower housing 11 while viewing a captured image (an image captured by one of the cameras) displayed on the lower LCD 12.

Next, with reference to FIG. 2, a description is given of the internal structure of the game apparatus 1. FIG. 2 is a block diagram showing an example of the internal structure of the game apparatus 1.

Referring to FIG. 2, the game apparatus 1 includes electronic components such as a CPU (Central Processing Unit) 31, a main memory 32, a memory control circuit 33, a storage data memory 34, a preset data memory 35, a memory card interface (memory card I/F) 36, a cartridge I/F 43, a wireless communication module 37, a real time clock (RTC) 38, a power circuit 39, and an interface circuit (I/F circuit) 40. These electronic components are mounted on electronic circuit boards, and then are provided in the lower housing 11 (or may be provided in the upper housing 21).

The CPU 31 is information processing means for executing a predetermined program (including the mobile terminal program according to the present invention). In the present embodiment, the predetermined program is stored in a memory (e.g., the storage data memory 34) included in the game apparatus 1 or the memory card 28 and/or the cartridge 29, so that the CPU 31 executes the predetermined program to thereby perform a terminal beacon transmission process, a location information transmission process, a location information request process, and a location information specifying process that are described later. Note that the program executed by the CPU 31 may be stored in a memory included in the game apparatus 1 in advance, or may be acquired from the memory card 28 and/or the cartridge 29, or may be acquired from another device by communication with said another device. For example, the program may be downloaded and acquired from a predetermined server via the Internet. Alternatively, the predetermined program stored in a stationary game apparatus may be downloaded and acquired from the stationary game apparatus by communication with the stationary game apparatus.

The main memory 32, the memory control circuit 33, and the preset data memory 35 are connected to the CPU 31. In addition, the memory control circuit 33 is connected to the storage data memory 34. The main memory 32 is storage means used as a work area or a buffer area of the CPU 31. That is, the main memory 32 stores therein various types of data used for the terminal beacon transmission process, the location information transmission process, the location information request process, and the location information specifying process, and also stores therein a program acquired from outside (e.g., the memory card 28, the cartridge 29, or another device) the game apparatus 1. In the present embodiment, for example, a PSRAM (Pseudo-SRAM) is used as the main memory 32. The storage data memory 34 is storage means for storing therein a program to be executed by the CPU 31, data of an image captured by the inner camera 23 or the outer camera 25, and the like. The storage data memory 34 is composed of a non-volatile storage medium. In the present embodiment, the storage data memory 34 is composed of, for example, a NAND flash memory. In accordance with an instruction from the CPU 31, the memory control circuit 33 controls the reading of data from or the writing of data into the storage data memory 34. The preset data memory 35 is storage means for storing therein data (preset data) such as various parameters that are set in advance in the game apparatus 1. As the preset data memory 35, a flash memory may be used that can be connected to the CPU 31 via an SPI (Serial Peripheral Interface) bus.

The memory card I/F 36 is connected to the CPU 31. In accordance with an instruction from the CPU 31, the memory card I/F 36 reads data from or writes data into the memory card 28 connected to the connector. In the present embodiment, for example, data of an image captured by the outer camera 25 is written into the memory card 28, and the image data stored in the memory card 28 is read from the memory card 28 and then is stored in the storage data memory 34.

The cartridge I/F 43 is connected to the CPU 31. In accordance with an instruction from the CPU 31, the cartridge I/F 43 reads data from or writes data into the cartridge 29 connected to the connector. In the present embodiment, for example, an application program executable by the game apparatus 1 is read from the cartridge 29 and is executed by the CPU 31, and data (e.g., data saved as a result of playing a game) about the application program is written into the cartridge 29.

Figure 4:
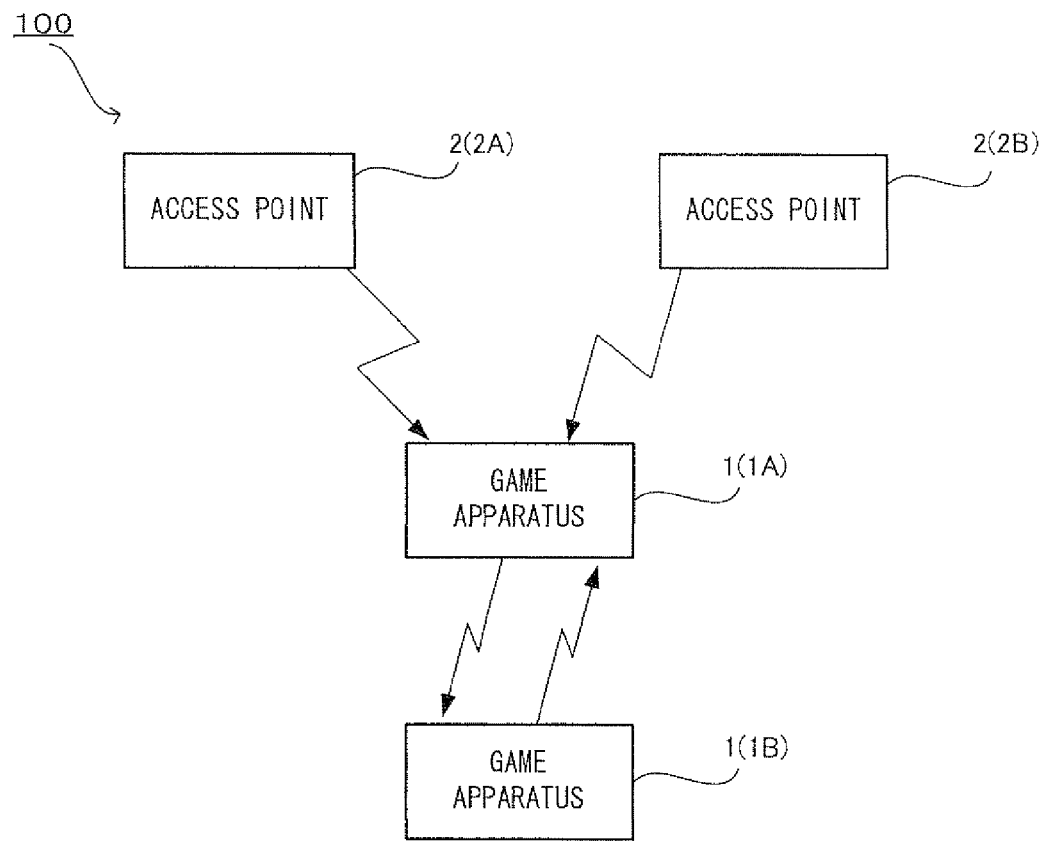
FIG. 4 is a diagram showing the structure of the location information provision system according to the first embodiment.

The wireless communication module 37 has the function of establishing connection with a wireless LAN by, for example, a method complying with the IEEE 802.11b/g standard. The wireless communication module 37 also has the function of wirelessly communicating with another game apparatus of the same type by a predetermined communication method. The wireless communication module 37 performs Near Field Communication, which is performed, for example, within the range of a data transmission distance of 10 m. As the radio waves used in the Near Field Communication, for example, radio waves are used that are weak enough so as not to require a radio station license. The wireless communication module 37 is connected to the CPU 31. The CPU 31 can transmit and receive data to and from another device via the Internet, or not via the Internet, using the wireless communication module 37. For example, the CPU 31 wirelessly communicates with an access point 2, described later with reference to FIG. 4, and therefore can acquire location information about the access point 2. With reference to FIG. 4, a description is given later of details of location information and the method of acquiring location information.

The CPU 31 can transmit and receive data to and from another game apparatus of the same type, using the wireless communication module 37. Note that hereinafter, in order to distinguish between the game apparatus 1 and another game apparatus 1 where necessary, the game apparatus 1 is referred to as a "game apparatus 1A", and another game apparatus 1 is referred to as a "game apparatus 1B". For example, when the game apparatus 1 (the game apparatus 1A) and the game apparatus 1B are each present in the communication range of the other (e.g., when the distance between the game apparatuses 1A and 1B is not greater than 10 m), the CPU 31 can transmit and receive to and from the game apparatus 1B. Additionally, in the present embodiment, the CPU 31 automatically communicates with the game apparatus 1B that is present within the communication range of the game apparatus 1A (hereinafter, such communication is referred to as "passing communication"), and automatically transmits and receives data to and from the game apparatus 1B. In the present embodiment, the game apparatus 1A can acquire, by "passing communication", location information stored in the game apparatus 1B, and can also provide, by "passing communication", the game apparatus 1B with location information stored in the game apparatus 1A. With reference to FIGS. 4 through 11B, a description is given later of details of the method of acquiring or providing location information.

The game apparatuses 1A and 1B perform "passing communication" only when each set to a "passing communication mode". The setting of the "passing communication mode" is made, for example, when the user operates the operation buttons 14A through 14K and the touch panel 13. When set to the "passing communication mode", the game apparatus 1A automatically and continuously searches for a game apparatus 1B, automatically communicates (by "passing communication") with the game apparatus 1B found as a result of the search, and, after the communication is completed, automatically disconnects the communication. Then the game apparatus 1A searches for another game apparatus 1B, and performs a similar process to that described above. When set to the "passing communication mode", the game apparatus 1A performs "passing communication" even if an application is not being executed, for example, even if the CPU 31 of the game apparatus 1A is in a power-saving state, e.g., a sleep state.

The RTC 38 and the power circuit 39 are connected to the CPU 31. The RTC 38 counts time and outputs the counted time to the CPU 31. For example, the CPU 31 can even calculate the current time (date) or the like based on the counted time. The power circuit 39 controls the power supplied from a power source (which is typically a battery and is accommodated in the lower housing 11) included in the game apparatus 1, and supplies power to each component of the game apparatus 1.

The game apparatus 1 includes a microphone 41 and an amplifier 42. The microphone 41 and the amplifier 42 are each connected to the I/F circuit 40. The microphone 41 detects a sound produced toward the game apparatus 1 by the user, and outputs to the I/F circuit 40 an audio signal representing the sound. The amplifier 42 amplifies the audio signal from the I/F circuit 40, and outputs the amplified audio signal through the speakers (not shown). The I/F circuit 40 is connected to the CPU 31.

The touch panel 13 is connected to the I/F circuit 40. The I/F circuit 40 includes an audio control circuit for controlling the microphone 41 and the amplifier 42 (the speakers), and a touch panel control circuit for controlling the touch panel 13. The audio control circuit performs A/D conversion and D/A conversion on an audio signal, and converts an audio signal into audio data in a predetermined format. The touch panel control circuit generates touch position data in a predetermined format, based on a signal from the touch panel 13, and outputs the touch position data to the CPU 31. For example, the touch position data represents the coordinates of the position, on the input surface of the touch panel 13, at which an input has been provided. The touch panel control circuit reads a signal from the touch panel 13 and generates touch position data, once in a predetermined period of time. The CPU 31 acquires touch position data from the I/F circuit 40, and therefore can recognize the position, on the touch panel 13, at which an input has been provided.

An operation button 14 includes the operation buttons 14A through 14K described above, and is connected to the CPU 31. Operation data is output from the operation button 14 to the CPU 31, the operation data representing the states of inputs provided to the operation buttons 14A through 14K (representing whether or not the operation buttons have been pressed), respectively. The CPU 31 acquires the operation data from the operation button 14 to thereby perform processes based on the inputs provided to the operation button 14.

The inner camera 23 and the outer camera 25 are connected to the CPU 31. The inner camera 23 or the outer camera 25 captures an image in accordance with an instruction from the CPU 31, and outputs data of the captured image to the CPU 31. In the present embodiment, the CPU 31 gives either one of the inner camera 23 and the outer camera 25 an instruction to perform capturing, and the camera that is given the instruction captures an image and outputs data of the captured image to the CPU 31.

The lower LCD 12 and the upper LCD 22 are connected to the CPU 31. The lower LCD 12 and the upper LCD 22 each display an image in accordance with an instruction from the CPU 31.

Figure 3:
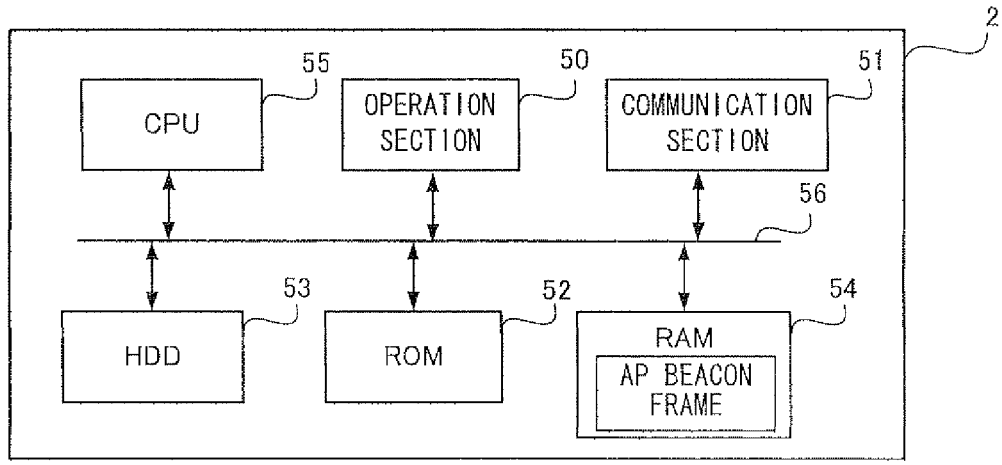
FIG. 3 is a block diagram showing an example of the internal structure of an access point.

Next, with reference to FIG. 3, the internal structure of an access point is described. FIG. 3 is a block diagram showing an example of the internal structure of an access point.

An access point 2 includes an operation section 50, a communication section 51, a ROM (Read Only Memory) 52, an HDD (Hard Disk Drive) 53, a RAM (Random Access Memory) 54, and a CPU 55, which are connected to one another via a bus 56 so as to communicate with one another.

The operation section 50 has the function of receiving an operation from an administrator of the access point 2. The communication section 51 has the function of establishing connection with a wireless LAN by, for example, a method complying with the IEEE 802.11b/g standard. The ROM 52 has stored therein a system program that starts up the access point 2 and performs basic functions. The HDD 53 has stored therein a program including a communication program that causes the access point 2 to communicate with the game apparatus 1, and also including data that is necessary for the execution of the program. In the HDD 53, as the data, location information representing the current location of the access point 2 is set by an administrator of the access point 2 or the like, for example, when the access point 2 is installed. Note that the HDD 53 does not need to be included in the access point 2, and may be connected, as a separate device, to the access point 2 from outside the access point 2. The RAM 54 functions as a work area of the CPU 55. The RAM 54 temporarily stores therein an AP beacon frame D6, described later with reference to FIG. 7F.

The CPU 55 executes the communication program and therefore wirelessly communicate with the game apparatus 1, using the communication section 51, to thereby provide the game apparatus 1 with the location information about the access point 2. Specifically, the CPU 55 does not actually transmit to the game apparatus 1 the location information, per se, stored in the access point 2, but transmits to the game apparatus 1 information (an AP beacon frame D6, described later with reference to FIG. 7F) for specifying the location information about the access point 2 that is stored in advance in the game apparatus 1, to thereby provide the game apparatus 1 with the location information. That is, the game apparatus 1 has stored therein a table in which pieces of location information about a plurality of access points 2 are registered, and searches for and detects one of the registered pieces of location information based on the information received from the access point 2, to be thereby provided with the location information by the access point 2.

A description is given below of the structure of the location information provision system according to the first embodiment.

FIG. 4 is a diagram showing the structure of the location information provision system according to the first embodiment. A location information provision system 100 includes a plurality of game apparatuses 1 and a plurality of access points 2. The game apparatuses 1 can wirelessly communicate with the access points 2 in compliance with the IEEE 802.11 wireless LAN standard. The plurality of game apparatuses 1 can wirelessly communicate with each other by a predetermined communication method as described above. FIG. 4 shows the state where, of two game apparatuses 1 (1A, 1B), the game apparatus 1A is provided with location information by each access point 2. Note that in the present embodiment, the location information provision system 100 includes two access points 2; however, as well as this, the location information provision system 100 may include an access point 2, or may include three or more access points 2. In addition, the location information provision system 100 may include three or more game apparatuses 1.

In the location information provision system 100, the access points 2 each provide the game apparatus 1A with location information. The location information represents the installation location of the corresponding access point 2, and is used as information representing a general current location of the game apparatus 1A. The location information may include, for example, information representing the latitude and the longitude of the corresponding access point 2, information representing the address of the access point 2, and image data of a peripheral map having its center at the location of the access point 2, but, as well as these, may include any information representing the location of the access point 2. The game apparatus 1A receives information representing location information from one of the access points 2 that is present within the accessible range of radio waves (e.g., within a radius of 50 to 100 m) of the game apparatus 1A, i.e., the nearest access point 2, and therefore can acquire, using the received information, the location information specifying the current location of the nearest access point 2, as information representing the current location of the game apparatus 1A.

Note that although described in detail later, in the present embodiment, the game apparatus 1A has stored therein in advance pieces of location information associated with pieces of identification information about the plurality of access points 2. Thus the game apparatus 1A receives identification information from one of the access points 2, and therefore can specify the location information.

Referring to FIG. 4, the game apparatus 1A is located within the accessible ranges of radio waves of two access points 2 (2A, 2B). Thus the game apparatus 1A wirelessly communicates with the access points 2A and 2B, and therefore can be provided with information by each of the access points 2A and 2B. The installation locations of the access points 2A and 2B are different from each other, and therefore the pieces of location information provided by the access points 2A and 2B are also different from each other. This enables the game apparatus 1A to acquire two different pieces of location information. Thus the game apparatus 1A needs to select either one of the different pieces of location information and specify the selected piece of location information as information representing the location of the game apparatus 1A.

In the present embodiment, the plurality of access points 2 are ranked for the game apparatus 1 based on reliabilities, so that the game apparatus 1 specifies, on a priority basis, location information from a high-rank access point 2 as information representing the location of the game apparatus 1. Specifically, an operator of the system 100 or the like ranks, among the plurality of access points 2, an access point 2 that is determined to have stored therein location information having high accuracy, as a "high-reliability access point". On the other hand, an access point 2 that is determined to have stored therein location information having low accuracy is ranked as a "low-reliability access point". Referring to FIG. 4, of the access points 2A and 22, the access point 2A is ranked as a "high-reliability access point", and the access point 2B is ranked as a "low-reliability access point". Hereinafter, the access points 2A and 2B are referred to as a "high-reliability access point 2A" and a "low-reliability access point 2B", respectively.

A factor for the operator to determine the rank of reliability (the reliability rank) of an access point 2 may be, for example, the degree of freedom for a user to rewrite the location information stored in the access point 2. Specifically, if an access point 2 is provided in a fixed manner at a shop, which provides a service, the access point 2 is unlikely to have stored therein location information representing an inaccurate current location. The reliability rank of such an access point 2 is set as a "high-reliability access point". In contrast, if an access point 2 can be easily provided by a general user, who is provided with a service, the location information can be easily rewritten by a general user. This makes it likely that the location information stored in the access point 2 represents an inaccurate current location. The reliability rank of such an access point 2 is set as a "low-reliability access point".

Note that the above factor to determine the reliability rank of an access point 2 is merely illustrative, and another factor may be used as a determining factor. In addition, the description where the reliability rank of an access point 2 provided in a fixed manner at a shop, which provides a service, is set as a "high-reliability access point", and the reliability rank of an access point 2 that can be easily provided by a general user, who is provided with a service, is set as a "low-reliability access point", is also merely illustrative, and therefore these reliability ranks may be set in an opposite manner, respectively.

Next, a description is given of the features of the location information provision system 100 according to the present embodiment. In the location information provision system 100, the game apparatus 1A can be not only provided with location information by each access point 2, but also provided with location information by a game apparatus 1B, which is another game apparatus of the same type, by "passing communication".

In order to be provided with location information by an access point 2, the game apparatus 1A needs to be located within the accessible range of radio waves of the access point 2. In the location information provision system 100, however, even if the game apparatus 1A is located out of the accessible range of radio waves of any access point 2, the game apparatus 1A can be provided with location information by the game apparatus 1B by "passing communication".

The location information acquired by "passing communication" is location information (hereinafter referred to as "specified-location information") that has been acquired from an access point 2 by the game apparatus 1B and specified as information representing the location of the game apparatus 1B, using the above method. This enables the game apparatus 1A to acquire location information without depending on the installation locations of the access points 2.

In addition, the game apparatus 1A can also distribute to the game apparatus 1B location information stored in the game apparatus 1A. In the present embodiment, the game apparatuses 1A and 1B store therein pieces of information (hereinafter referred to as "elapsed-time information") representing the time elapsed since pieces of location information have been acquired from an access points 2 in association with pieces of specified-location information, respectively.

With reference to the pieces of elapsed-time information, if the specified-location information stored in the game apparatus 1B has been acquired from the access point 2 more recently than specified-location information stored in the game apparatus 1A has been, the game apparatus 1A is to be provided with the specified-location information by the game apparatus 1B. On the other hand, if the specified-location information stored in the game apparatus 1A has been acquired from the access point 2 more recently than the specified-location information stored in the game apparatus 1B has been, the game apparatus 1A is to provide the game apparatus 1B with location information.

In the example of FIG. 4, the game apparatus 1A is to be provided with location information, and the game apparatus 1B is to provide location information.

In addition, the location information provision system 100 according to the present embodiment is characterized by, as described above, allowing a plurality of game apparatuses 1 to provide each other with location information, and is also characterized by performing a process of invalidating (discarding) location information that has expired since it had been provided to the game apparatus 1A. Since the game apparatus 1A travels while carried by the user, it is likely that location information that has been acquired by the game apparatus 1A a long time ago does not represent the current location of the game apparatus 1A. Thus the discarding of location information that has expired prevents location information that does not represent the current location of the game apparatus 1A from being specified as information representing the current location of the game apparatus 1A. Details of this process are described later with reference to FIG. 13.

Figure 5:
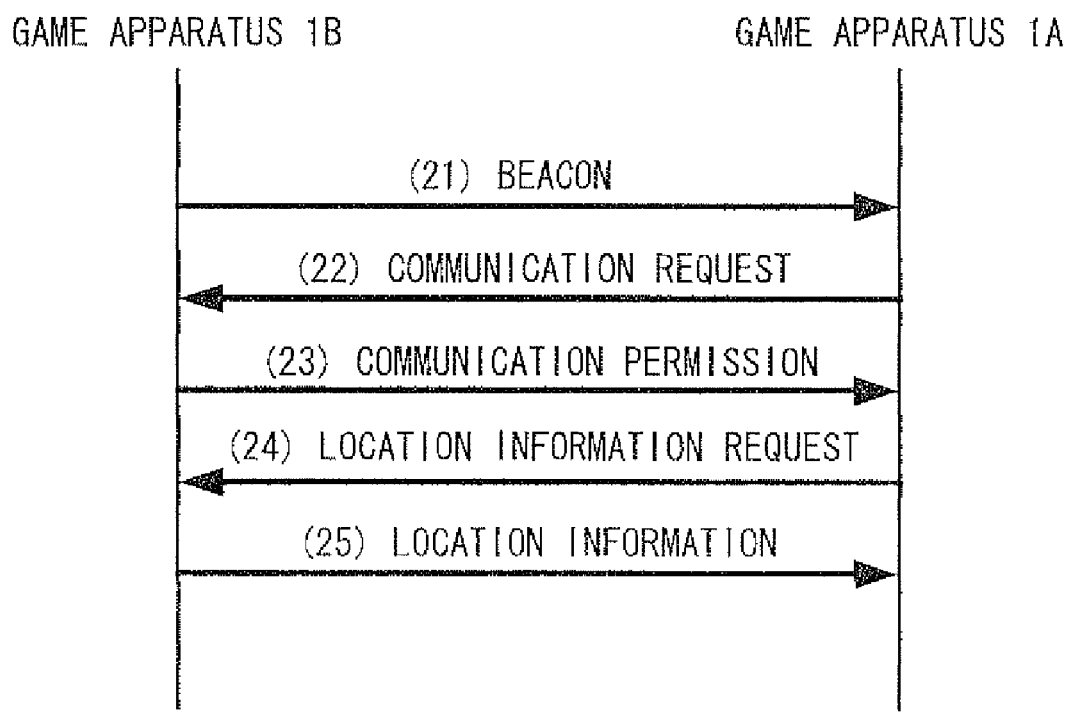
FIG. 5 is a communication sequence diagram showing an example of communication for a game apparatus to provide another game apparatus with location information.

A description is given below of communication for the game apparatus 1B to provide the game apparatus 1A with location information. FIG. 5 is a communication sequence diagram showing an example of the communication for the game apparatus 1B to provide the game apparatus 1A with location information.

First, the game apparatus 1B transmits by broadcast a terminal beacon frame representing the presence and the contents of the game apparatus 1B, periodically at predetermined time intervals (e.g., every 3 seconds) ((21) of FIG. 5). The terminal beacon frame includes elapsed-time information as described above. The game apparatus 1A is located within the accessible range of radio waves of the game apparatus 1B, and therefore performs a channel scanning process to thereby receive the terminal beacon frame.

When having received the terminal beacon frame, the game apparatus 1A compares the elapsed-time information about the specified-location information stored in the game apparatus 1A with the elapsed-time information included in the terminal beacon frame. In this example, by this comparison, the game apparatus 1A determines that the specified-location information stored in the game apparatus 1B has been acquired from an access point 2 more recently than the specified-location information stored in the game apparatus 1A has been. In order to establish communication with the game apparatus 1B, the game apparatus 1A transmits a communication request to the game apparatus 1B ((22) of FIG. 5). When having received the communication request, the game apparatus 1B gives the game apparatus 1A communication permission in order to establish communication with the game apparatus 1A ((23) of FIG. 5).

When having established communication with the game apparatus 1B, the game apparatus 1A requests the game apparatus 1B to provide the game apparatus 1A with the location information ((24) of FIG. 5). In response to this request, the game apparatus 1B transmits the location information to the game apparatus 1A ((25) of FIG. 5).

The communication method described above is merely illustrative, and any communication method may be applied so long as the game apparatus 1B can provide the game apparatus 1A with location information. For example, the game apparatus 1B may distribute by broadcast a terminal beacon frame including location information, to thereby provide the game apparatus 1A with the location information. This method makes it possible to reduce the time required to transmit and receive data that is necessary for the provision of location information. Alternatively, a terminal beacon frame may not include elapsed-time information so that the game apparatus 1B transmits elapsed-time information to the game apparatus 1A after communication between the game apparatuses 1A and 1B has been established. This method makes it possible to provide the game apparatus 1A with location information with increased certainty. Yet alternatively, the game apparatus 1A may transmit by broadcast a terminal beacon frame periodically at predetermined time intervals so as to be provided with location information by the game apparatus 1B that has received the terminal beacon frame.

Note that with reference to FIGS. 7A through 7F, a description is given later of details of the frames transmitted and received in the communication shown in FIG. 5.

Figure 6:
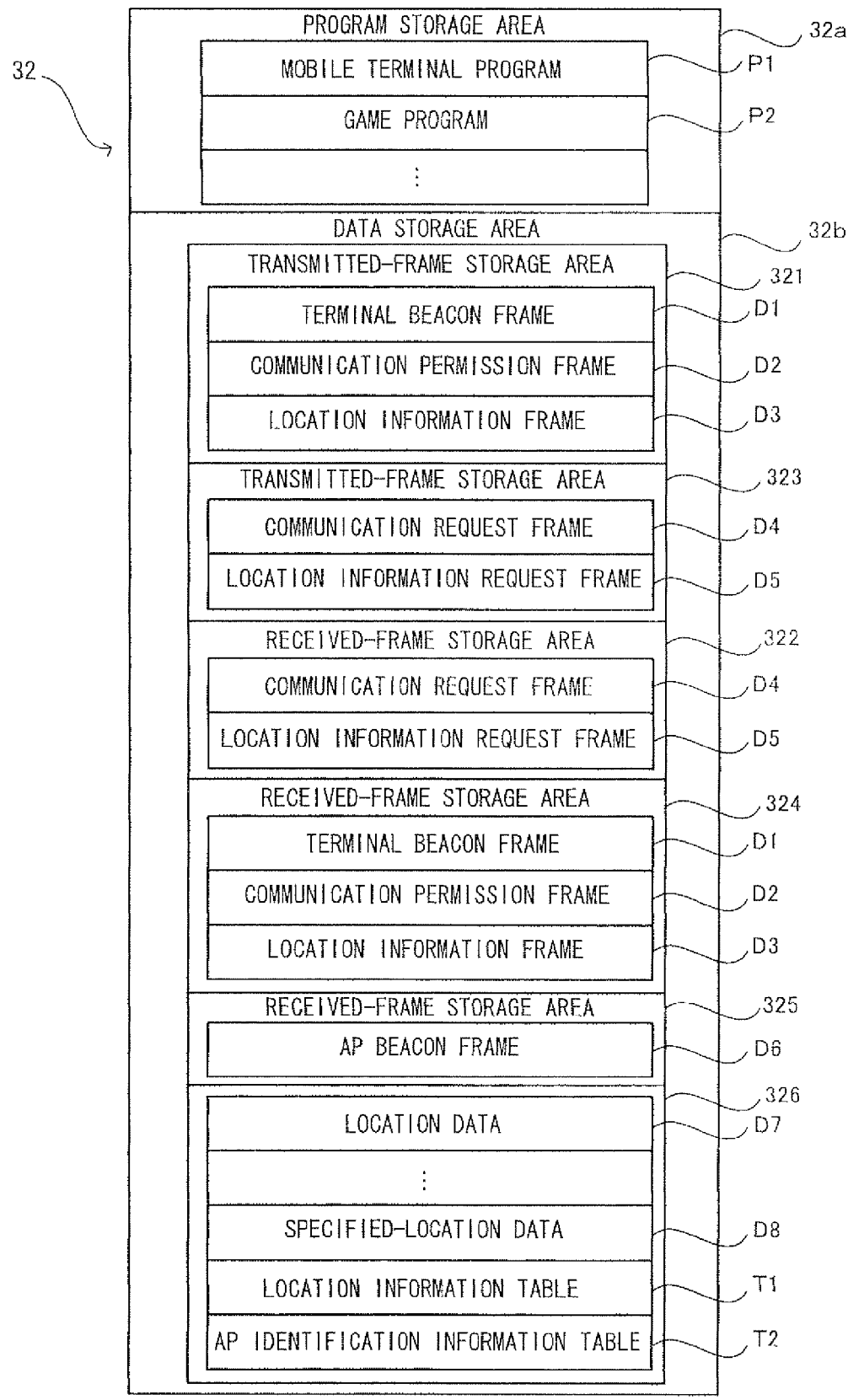
FIG. 6 is a diagram showing programs and various types of data that are stored in the game apparatus in accordance with the execution of a mobile terminal program according to the present invention.

Next, with reference to FIG. 6, a description is given of various types of programs and various types of data that are stored in the main memory 32 by the game apparatus 1.

FIG. 6 is a diagram showing programs and various types of data that are stored in the game apparatus 1 in accordance with the execution of the mobile terminal program according to the present invention.

The main memory 32 includes a program storage area 32a where programs are stored, and a data storage area 32b where data is stored.

The program storage area 32a has stored therein a mobile terminal program P1, a game program P2, and the like. The mobile terminal program P1 includes a program that causes the game apparatus 1A to perform a communication process (a terminal beacon transmission process and a location information transmission process) for transmitting location information to the game apparatus 1B, and a communication process (a location information request process) for receiving location information from the game apparatus 1B. The mobile terminal program P1 also includes a program that causes the game apparatus 1A to perform a process (a location information specifying process) of determining, based on acquired location information, specified-location information representing the current location of the game apparatus 1A. Note that with reference to FIG. 9 and the like, descriptions are given later of details of the terminal beacon transmission process, the location information transmission process, the location information request process, and the location information specifying process.

The game program P2 is a program that defines the entire game process performed by the game apparatus 1. The game apparatus 1 executes the game program P2, and therefore can provide the user of the game apparatus 1 with a game. In the present embodiment, it is possible to reflect the content of specified-location information on the content of the game. For example, when specified-location information represents a location in a specific region (e.g., in a prefecture such as Kyoto or Osaka), an item of a specialty of the region is provided to a player character in a game space, and a background object representing the region is arranged in the game space. Note that as well as reflecting the content of specified-location information on the content of the game, for example, a location (e.g., a latitude and a longitude) represented by location information may simply be displayed in accordance with a user's operation.

Note that the mobile terminal program P1 is read as appropriate from the program stored in the storage data memory 34 and is stored. The program stored in the storage data memory 34 has been downloaded from a server (not shown), or has been read from the memory card 28, so as to be stored in advance. The game program P2 is read as appropriate from the memory card 28 in accordance with the progression of the game. However, the present invention is not limited to this. For example, the mobile terminal program P1 may also be read as appropriate from the memory card 28, as is the game program P2. In this case, the mobile terminal program P1 may be included in the game program P2. The mobile terminal program P1 and the game program P2 may be downloaded collectively from a server (not shown) or the game apparatus 1B, or may be downloaded as appropriate in accordance with the progression of the game, so as to be stored.

The data storage area 32b includes a transmitted-frame storage area 321 and a received-frame storage area 322. The transmitted-frame storage area 321 stores therein a transmitted frame when the game apparatus 1A is to provide the game apparatus 1B with location information. The received-frame storage area 322 stores therein a received frame in this case. The data storage area 32b also includes a transmitted-frame storage area 323 and a received-frame storage area 324. The transmitted-frame storage area 323 stores therein a transmitted frame when the game apparatus 1A is to be provided with location information by the game apparatus 1B. The received-frame storage area 324 stores therein a received frame in this case. The data storage area 32b also includes a received-frame storage area 325 and a data storage area 326 for other types of data. The received-frame storage area 325 stores therein a frame received from an access point 2.

The transmitted-frame storage area 321 temporarily stores therein a terminal beacon frame D1, a communication permission frame D2, and a location information frame D3. The frames D1 through D3 are to be transmitted from the game apparatus 1A to the game apparatus 1B, by the terminal beacon transmission process and the location information transmission process. With reference to FIGS. 7A through 7C, descriptions are given below of examples of the frame structures of the terminal beacon frame D1, the communication permission frame D2, and the location information frame D3, respectively.

FIG. 7A is a diagram showing an example of the frame structure of the terminal beacon frame D1. The terminal beacon frame D1 is transmitted at the time represented by (21) of FIG. 5. Note that in the example of FIG. 5, the game apparatus 1B performs the terminal beacon transmission process and the location information transmission process, and the game apparatus 1A performs the location information request process so that the game apparatus 1B distributes location information to the game apparatus 1A. In contrast, however, it is assumed here that the game apparatus 1A performs the terminal beacon transmission process and the location information transmission process, and the game apparatus 1B performs the location information request process so that the game apparatus 1A distributes location information to the game apparatus 1B.

The beacon frame D1 includes a frame type F_TYP, a source MAC (Media Access Control) address, and elapsed-time information. The frame type F_TYP represents the type of the frame, and has written therein information representing that the frame is a terminal beacon frame. The source MAC address represents the MAC address of the game apparatus 1A. The elapsed-time information represents the time elapsed since the specified-location information about the game apparatus 1 has been acquired. In the present embodiment, the elapsed-time information includes information (acquisition time information) representing the time when the specified-location information has been acquired based on information acquired from the access point 2, and also includes information (valid time information: a counter value) representing the remaining valid time of the specified-location information. However, the elapsed-time information may include only one of the acquisition time information and the valid time information.

FIG. 7B is a diagram showing an example of the frame structure of the communication permission frame D2. The communication permission frame D2 is transmitted at the time represented by (23) of FIG. 5. As described above, in the example of FIG. 5, the provider and the receiver of location information are opposite to those of this example.

The communication permission frame D2 includes a frame type F_TYP, a destination MAC address, a source MAC address, result information, and communication information. In this case, the frame type F_TYP has written therein information representing that the frame is a communication permission frame. The destination MAC address represents the MAC address of the game apparatus 1B, to which the notification of permission or nonpermission for communication is given. The source MAC address represents the MAC address of the game apparatus 1A. The result information represents permission or nonpermission for communication with the game apparatus 1B, which is determined by the game apparatus 1A. The communication information is necessary for the establishment of communication between the game apparatus 1A and the game apparatus 1B, and includes, for example, information representing a communication channel.

FIG. 7C is a diagram showing an example of the frame structure of the location information frame D3. The location information frame D3 is transmitted at the time represented by (25) of FIG. 5. As described above, in the example of FIG. 5, the provider and the receiver of location information are opposite to those of this example.

The location information frame D3 includes a frame type F_TYP, a destination MAC address, a source MAC address, location information, access point identification information (hereinafter referred to as "AP identification information"), elapsed-time information, and the like. In this case, the frame type F_TYP has written therein information representing that the frame is a location information frame. The destination MAC address represents the MAC address of the game apparatus 1B, which is the destination to which the location information is transmitted. The source MAC address represents the MAC address of the game apparatus 1A. The location information is the specified-location information stored in the game apparatus 1A. The AP identification information represents the reliability rank of the access point (represents whether the access point 2 is ranked as a "high-reliability access point" or a "low-reliability access point") that has provided the specified-location information. As described above, the elapsed-time information represents the time elapsed since the specified-location information about the game apparatus 1 has been acquired.

Referring back to FIG. 6, the received-frame storage area 322 temporarily stores therein a communication request frame D4 and a location information request frame D5. The frames D4 and D5 are received by the game apparatus 1A from the game apparatus 1B, by the terminal beacon transmission process and the location information transmission process. With reference to FIGS. 7D and 7E, descriptions are given below of examples of the frame structures of the communication request frame D4 and the location information request frame D5, respectively.

FIG. 7D is a diagram showing an example of the frame structure of the communication request frame D4. The communication request frame D4 is received at the time represented by (22) of FIG. 5. As described above, in the example of FIG. 5, the provider and the receiver of location information are opposite to those of this example.

The communication request frame D4 includes a frame type F_TYP, a destination MAC address, a source MAC address, and the like. The frame type F_TYP has written therein information representing that the frame is a communication request frame. The destination MAC address represents the MAC address of a game apparatus 1 that receives a communication request, and in this case, represents the MAC address of the game apparatus 1A. The source MAC address represents the MAC address of another game apparatus 1 that transmits a communication request to the game apparatus 1A, and in this case, represents the MAC address of the game apparatus 1B.

FIG. 7E is a diagram showing an example of the frame structure of the location information request frame D5. The location information request frame D5 is received at the time represented by (24) of FIG. 5. As described above, in the example of FIG. 5, the provider and the receiver of location information are opposite to those of this example.

The location information request frame D5 includes a frame type F_TYP, a destination MAC address, a source MAC address, and the like. The frame type F_TYP has written therein information representing that the frame is a location information request frame. The destination MAC address represents the MAC address of a game apparatus 1 that is requested to distribute location information, and in this case, represents the MAC address of the game apparatus 1A. The source MAC address represents the MAC address of another game apparatus 1 that requests location information, and in this case, represents the MAC address of the game apparatus 1B.

Referring back to FIG. 6, descriptions are given of frames stored in the transmitted-frame storage area 323 and the received-frame storage area 324. The transmitted-frame storage area 323 temporarily stores therein a frame that is to be transmitted from the game apparatus 1A to the game apparatus 1B, by the location information request process. The received-frame storage area 324 temporarily stores therein a frame that has been received from the game apparatus 1B, by the location information request process.

As described above, when the game apparatus 1A is to provide the game apparatus 1B with the specified-location information stored in the game apparatus 1A, the transmitted-frame storage area 321 stores therein the frames D1 through D3, and the received-frame storage area 322 stores therein the frames D4 and D5. In contrast, when the game apparatus 1A is to be provided with the specified-location information stored in the game apparatus 1B by the game apparatus 1B, the transmitted-frame storage area 323 stores therein the communication request frame and the location information request frame D5. The received-frame storage area 324 stores therein the terminal beacon frame DI, the communication permission frame D2, and the location information frame D3.

In addition, the received-frame storage area 325 stores therein an AP beacon frame D6 received from an access point 2.

FIG. 7F is a diagram showing an example of the frame structure of the AP beacon frame D6. The AP beacon frame D6 includes a frame type F_TYP, a BSSID (Basic Service Set ID), an ESSID (Extended Service ID), security information, an RSSI (Received Signal Strength Indication), channel information, and the like. The frame type F_TYP has written therein information representing that the frame is an AP beacon frame. The BSSID is specific identification information for identifying the access point 2. The ESSID is specific identification information for identifying the network, and in this case, has written therein identification information specific to the wireless LAN that includes the access points 2 and the game apparatus 1A. The security information is information for assuring the security of the communication between the access points 2 and the game apparatus 1A. The RSSI is information for the game apparatus 1A to measure the intensity of the signal that is received. The channel information represents the channel used for the communication between the access point 2 and the game apparatus 1A.

As described above, the AP beacon frame D6 does not include the location information, and therefore the game apparatus 1A cannot acquire the location information by simply receiving the AP beacon frame D6. The AP beacon frame D6, however, includes the BSSID, which is identification information specific to the access point 2, and therefore the game apparatus 1A can acquire the location information with reference to a location information table T1, described later, using the BSSID included in the AP beacon frame D6. Details of the process of acquiring the location information are described later. Note that the structure of the AP beacon frame D6 is not limited to that of the above example, and may include the location information.

In addition, the AP beacon frame D6 includes the ESSID, which is identification information specific to the network, and therefore the game apparatus 1A can acquire the AP identification information about the access point 2 with reference to an AP identification information table T2, described later, using the ESSID. Details of the process of acquiring the AP identification information are described later. As described above, the AP identification information is the reliability rank (a high-reliability access point or a low-reliability access point) of the access point 2.

Referring back to FIG. 6, data stored in the data storage area 326 is described. The data storage area 326 stores therein location data D7, specified-location data D8, a location information table T1, an AP identification information table T2, and the like.

The location data D7 is generated so as to include the location information provided by the game apparatus 1B or the access point 2, and is stored. Note that when a plurality of pieces of location information are provided by the game apparatus 1B and the access points, a plurality of pieces of location data D7 may be generated and stored. The data storage area 326 can store therein a predetermined number of pieces of location data D7. With reference to FIGS. 8A and 8B, a description is given below of the contents of the location data D7.

Figure 12:
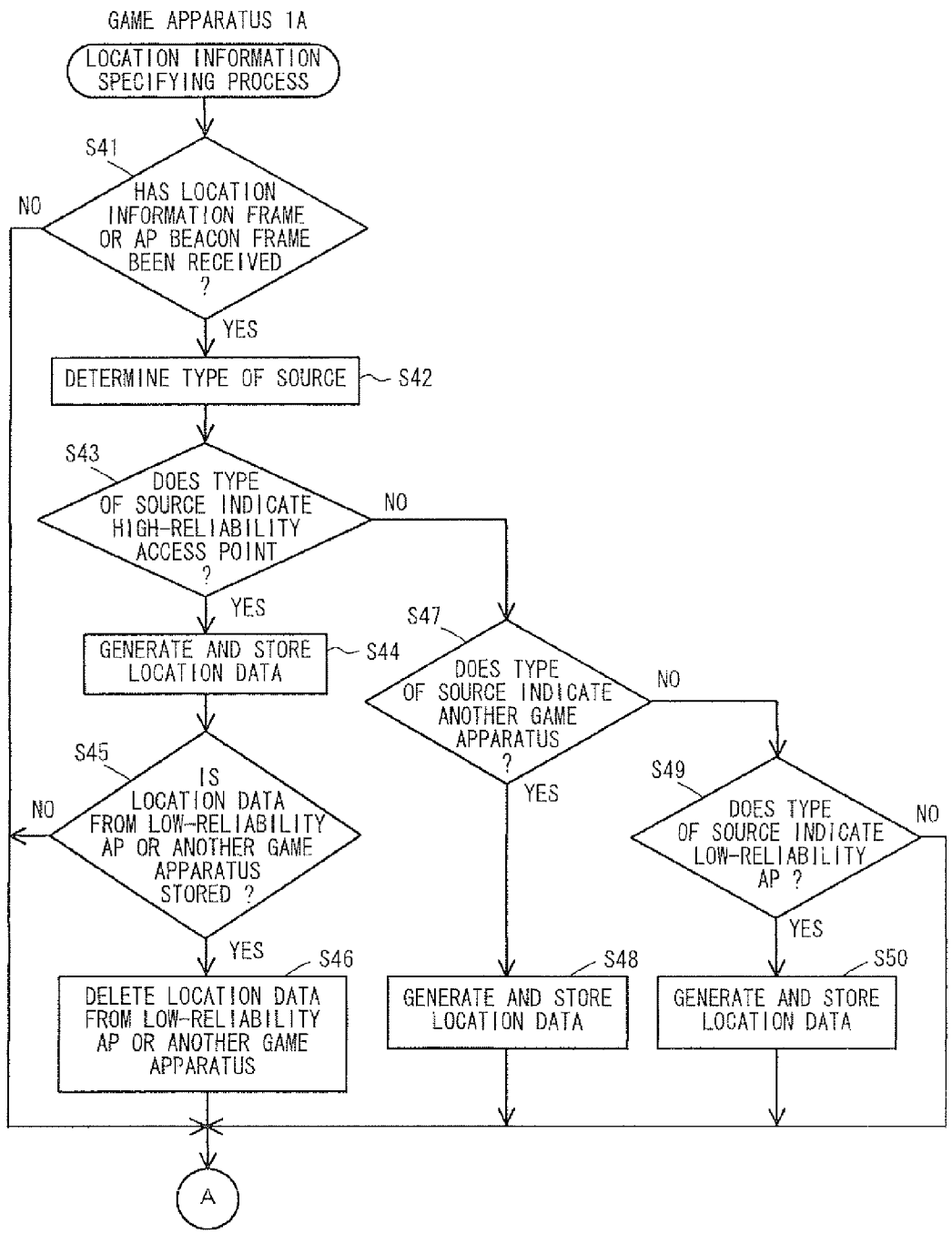
FIG. 12 is a flow chart (part 1) showing an example of a location information specifying process performed in step S4 of FIG. 9.

FIG. 8A is a diagram showing location data D7 including the location information provided by the access point 2. Hereinafter, the location data D7 received from the access point 2 is referred to as "AP location data D7a". The AP location data D7a includes location information, AP identification information, and elapsed-time information (valid time information and acquisition time information). In this case, the location information is acquired by searching the location information table T1, described later, using the BSSID of the received AP beacon frame D6. The AP identification information is acquired by searching the AP identification information table T2, described later, using the ESSID of the received AP beacon frame D6. With reference to FIG. 12, a description is given later of details of the method of generating the AP location data D7a. The contents of the location information, the AP identification information, the elapsed-time information, the valid time information, and the acquisition time information are the same as those described above.

FIG. 8B is a diagram showing location data D7 including the location information provided by the game apparatus 1B. Hereinafter, the location data D7 including the location information provided by the game apparatus 1B is referred to as "terminal location data D7b". The terminal location data D7b includes location information, AP identification information, elapsed-time information, and other-game-apparatus-derived information. The location information, the AP identification information, and the elapsed-time information that are included in the terminal location data D7b are the same as those included in the location information frame received from the game apparatus 1B. The contents of the location information, the AP identification information, the elapsed-time information, the valid time information, and the acquisition time information are the same as those described above.

The other-game-apparatus-derived information represents that the location information is received from the game apparatus 1B. Based on whether other-game-apparatus-derived information is included in location data D7, the game apparatus 1A can determine whether or not the location data D7 is terminal location data D7b, which includes location information provided by the game apparatus 1B, and is not AP location data D7a, which includes location information provided by an access point 2. With reference to FIG. 12, a description is given later of details of the method of generating the terminal location data D7b.

Figure 13:
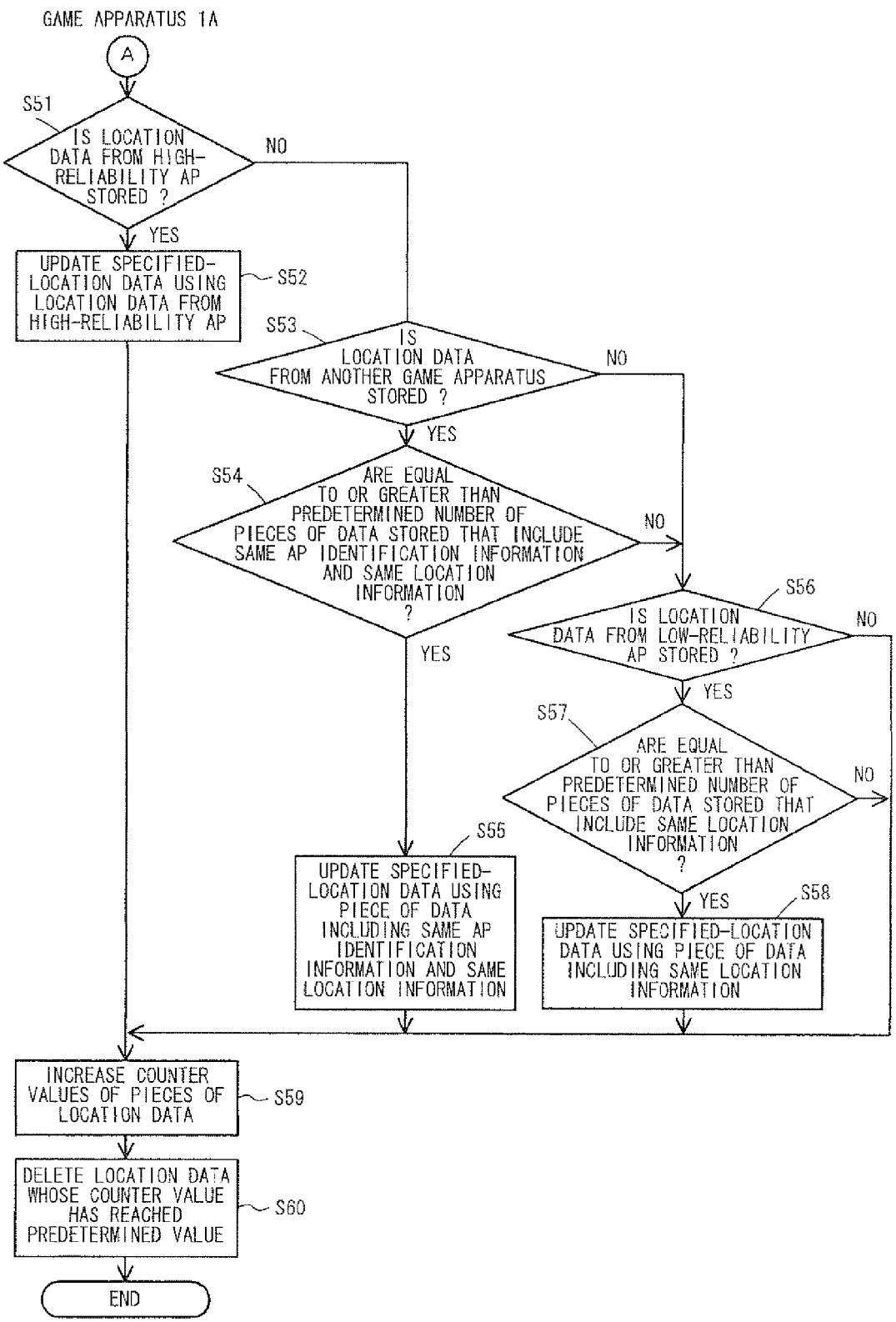
FIG. 13 is a flow chart (part 2) showing the example of the location information specifying process performed in step S4 of FIG. 9.

The specified-location data D8 is specified, among pieces of location data D7 as described above, as location data D7 including location information (specified-location information) representing the current location of the game apparatus 1A. With reference to FIGS. 12 and 13, a description is given later of details of the location information specifying process for determining the specified-location data D8 among one or more pieces of location data D7. Note that only one piece of specified-location data D8 can be stored; however, some pieces of specified-location data D8 of the past may be stored as a log.

Referring back to FIG. 6, descriptions are given of the location information table T1 and the AP identification information table T2. FIG. 8C is a diagram showing an example of the location information table T1. As shown in FIG. 8C, the location information table T1 is a table in which a plurality of pieces of location information are registered in association with a plurality of BSSIDs. In the location information table T1, pieces of location information representing the current locations of the access points 2 identified by the BSSIDs, respectively, are registered in association with the BSSIDs. Thus it is possible, by searching the location information table T1 using a BSSID, to acquire the location information about the access point 2 associated with the BSSID.

Note that the pieces of location information registered in the location information table T1 are the same as the pieces of location information registered in the access points 2, respectively. The pieces of location information are, for example, registered in advance by an operator of the location information provision system 100, or automatically registered when the game apparatus 1A communicates with the access points 2 in advance.

FIG. 8D is a diagram showing an example of the AP identification information table T2. As shown in FIG. 8D, the AP identification information table T2 is a table in which a plurality of pieces of AP identification information are registered in association with a plurality of ESSIDs. As described above, the ESSIDs are identification information specific to the network. In the AP identification information table T2, pieces of AP identification information representing the reliability ranks associated with the ESSIDs, respectively, are registered. Thus it is possible, by searching the AP identification information table T2 using an ESSID, to acquire the AP identification information associated with the ESSID.

Note that the pieces of location information registered in the AP identification information table T2 are, for example, registered in advance by an operator of the location information provision system 100. The tables T1 and T2 are read from the storage data memory 34 and are stored. The tables T1 and T2 are downloaded from a server (not shown) or read from the memory card 28, to be thereby stored in the storage data memory 34.

With reference to FIGS. 8C and 8D, a description is given of a process for the game apparatus 1A being provided with location information by an access point 2. An access point 2 transmits by broadcast an AP beacon frame D6 periodically at predetermined time intervals. If the game apparatus 1A is present within the accessible range of radio waves of the AP beacon frame D6, the game apparatus 1A can receive the AP beacon frame D6. With reference to the ESSID included in the AP beacon frame D6, if the ESSID is the same as one of the ESSIDs registered in the game apparatus 1A, the game apparatus 1A acquires the location information specified by the AP beacon frame D6.

Specifically, the game apparatus 1A searches the location information table T1 using the BSSID included in the received AP beacon frame D6, and therefore can acquire the location information associated with the BSSID. The location information represents the location of the access point 2 that is the source of the AP beacon frame D6. Then the game apparatus 1 searches the AP identification information table T2 using the ESSID included in the received AP beacon frame D6, and acquires the AP identification information associated with the ESSID. The AP identification information represents the reliability rank of the location information acquired from the location information table T1.

Note that in the present embodiment, the AP beacon frame does not include the location information or the AP identification information, so that the location information is acquired using the tables T1 and T2 stored in the game apparatus 1A; however, the present invention is not limited to this. For example, an access point 2 may transmit to the game apparatus 1A an AP beacon frame D6 including the location information and the AP identification information, so that the game apparatus 1A is provided with the location information and the AP identification information. In this case, the game apparatus 1A does not store therein the tables T1 and T2.

Note that only when set to an "AP communication mode", the game apparatus 1A communicates to receive an AP beacon frame from an access point 2. When set to the "AP communication mode", the game apparatus 1A automatically and continuously searches for an access point 2, automatically communicates with the access point 2 found as a result of the search, and, after the communication is completed, automatically disconnects the communication. Then the game apparatus 1A searches for another access point 2, and performs a similar process to that described above. When set to the "AP communication mode", the game apparatus 1A performs the communication described above even if an application is not being executed, for example, even if the CPU 31 of the game apparatus 1A is in a power-saving state, e.g., a sleep state. However, even when not set to the "AP communication mode", the game apparatus 1A may be allowed to receive an AP beacon frame.

Next, with reference to FIGS. 7A through 7F, 8A through 8D, and 9 through 13, descriptions are given of a process for the game apparatus 1A being provided with location information by the game apparatus 1B, and a process (the location information specifying process) of specifying, based on the provided location information, location information representing the current location of the game apparatus 1A.

Figure 9:
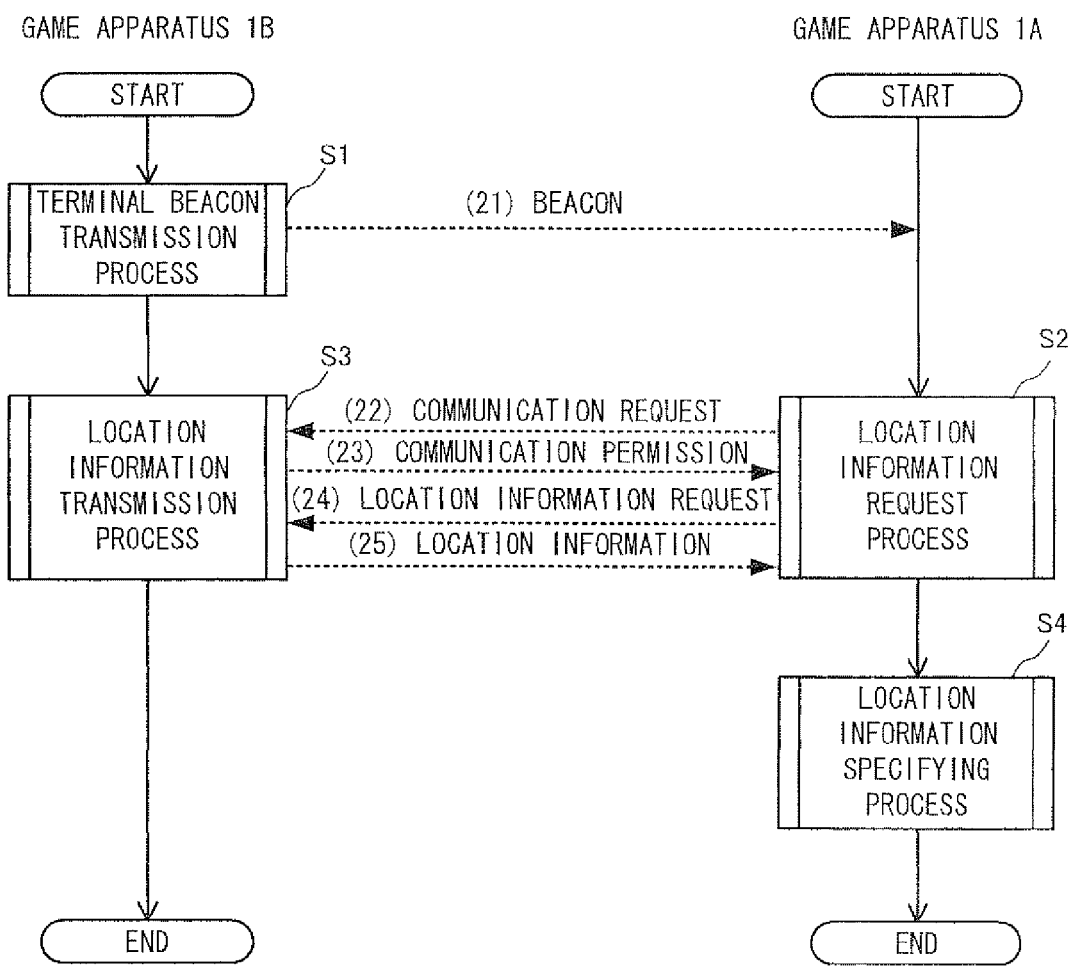
FIG. 9 is a flow chart showing an example of the process for the game apparatus being provided with location information by said another game apparatus.

FIG. 9 is a flow chart showing an example of the process for the game apparatus 1A being provided with location information by the game apparatus 1B. This process is performed by the CPUs 31 of the game apparatuses 1A and 1B. Hereinafter, the CPU 31 of the game apparatus 1A is referred to as a "CPU 31A", and the CPU 31 of the game apparatus 1B is referred to as a "CPU 31B".

First, the CPU 31B of the game apparatus 1B performs the terminal beacon transmission process to thereby transmit a terminal beacon frame D1 by broadcast (S1; (21) of FIG. 9). The terminal beacon frame D1 includes the elapsed-time information about the location information stored in the game apparatus 1B.

When having received the terminal beacon frame D1, the CPU 31A of the game apparatus 1A performs the location information request process (S2). In the location information request process, the CPU 31A compares the elapsed-time information included in the terminal beacon frame D1 with the elapsed-time information about the specified-location information stored in the game apparatus 1A, so as to determine which of the location information stored in the game apparatus 1B and the location information stored in the game apparatus 1A has been received from an access point 2 more recently. When it is determined that the location information stored in the game apparatus 1B has been received more recently, the CPU 31A of the game apparatus 1A transmits a communication request to the game apparatus 1B in order to establish communication with the game apparatus 1B ((22) of FIG. 9). After communication has been established, the CPU 31A of the game apparatus 1A requests the location information from the game apparatus 1B ((24) of FIG. 9).

when having received the communication request from the game apparatus 1A, the CPU 31B of the game apparatus 1B performs the location information transmission process (S3). In the location information transmission process, in response to the communication request from the game apparatus 1A, the CPU 31B of the game apparatus 1B notifies the game apparatus 1A of permission (or non-permission) for communication ((23) of FIG. 9). As described above, when the notified game apparatus 1A requests the location information, the CPU 31B of the game apparatus 1B, in response to this request for the location information, transmits the location information to the game apparatus 1A ((25) of FIG. 9).

The CPU 31A of the game apparatus 1A performs the location information specifying process to thereby specify, based on the location information provided by the game apparatus 1B and the location information provided by the access point 2, location information representing the current location of the game apparatus 1A (54). Then the process ends.

Here, in the flow chart of FIG. 9, the terminal beacon transmission process (S1) and the location information specifying process (S4) are performed periodically at predetermined time intervals. The location information transmission process (S3) and the location information request process (S2) are performed as necessary. In the flow chart of FIG. 9, for ease of description, the game apparatus 1B performs the terminal beacon transmission process (S1), and then performs the location information transmission process (S3). In addition, the location information request process (S2) is performed before the location information specifying process (S4). The location information transmission process (S3), however, does not necessarily need to be performed after the terminal beacon transmission process (S1). Similarly, the location information request process (S2) does not necessarily need to be performed before the location information specifying process (S4). The location information transmission process (S3) only needs to be performed when a communication request has been transmitted from the game apparatus 1A. The location information request process (S2) only needs to be performed when the game apparatus 1A has received a terminal beacon frame from the game apparatus 1B.

Note that in the present embodiment, a plurality of game apparatuses 1 can transmit and receive location information to and from each other only by "passing communication". Thus the game apparatus 1A and the game apparatus 1B perform the process of steps S1 through S3 only when a game apparatus 1 that distributes location information and another game apparatus 1 that acquires location information are each set to the "passing communication mode".

With reference to FIGS. 7A, 8A, 8B, and 10, a description is given below of the terminal beacon transmission process.

Figure 10:
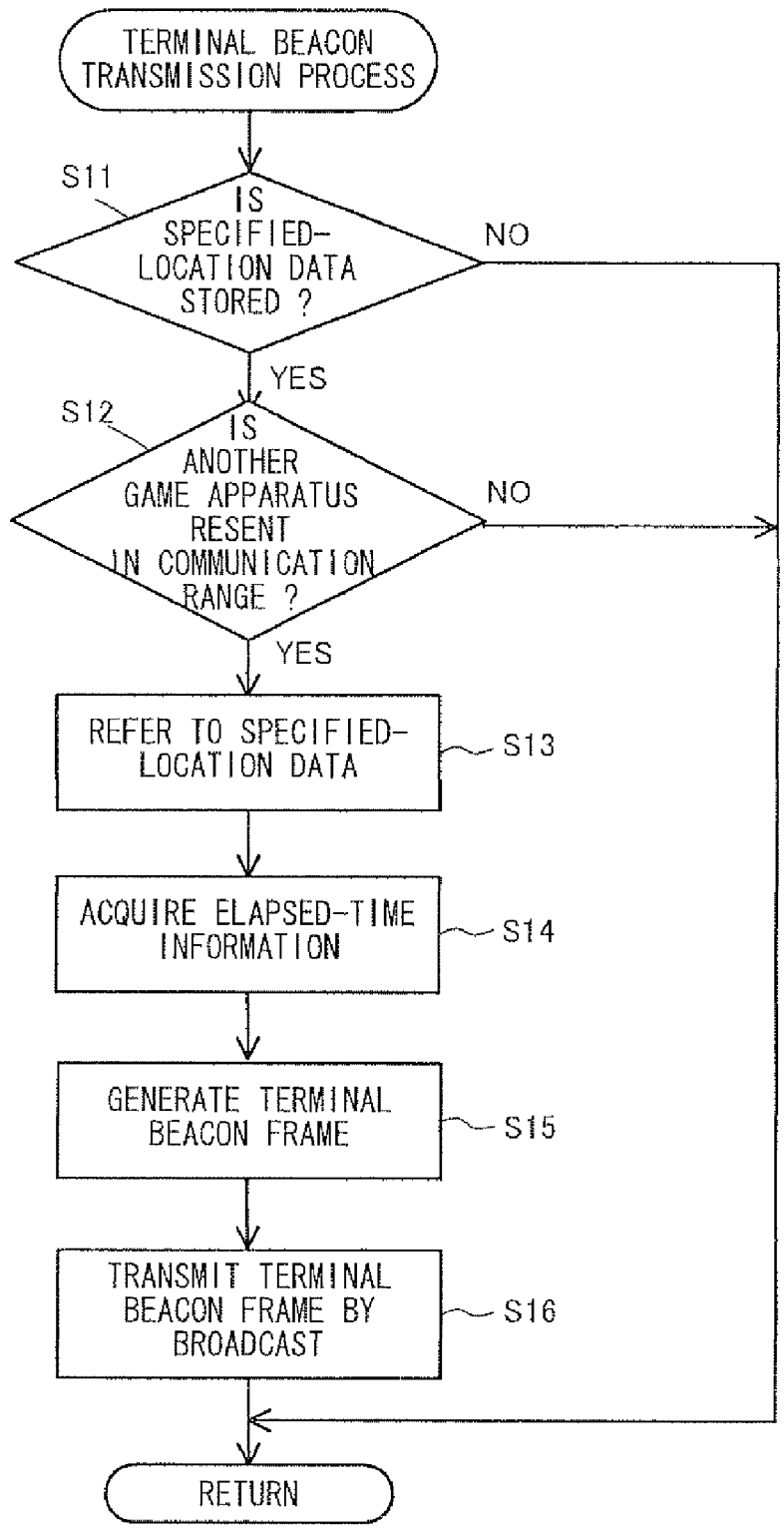
FIG. 10 is a flow chart showing an example of a terminal beacon process performed in step S1 of FIG. 9.

FIG. 10 is a flow chart showing an example of the terminal beacon process performed in step S1 of FIG. 9. The terminal beacon process is performed by the CPU 31B of the game apparatus 1B periodically at predetermined time intervals (e.g., every 3 seconds).

First, the CPU 31B determines, with reference to the data storage area 326 (see FIG. 6), whether or not specified-location data D8 is stored therein (S11). When specified-location data D8 is not stored ("NO" in S11), the CPU 312 ends the process of this subroutine. When specified-location data D8 is stored ("YES" in S11), the CPU 31B determines whether or not another game apparatus 1 is present in the communication range of the game apparatus 1B (S12). This determination is made by measuring the radio field intensity of the periphery of the game apparatus 1B.

When it is determined that another game apparatus 1 is present in the communication range ("NO" in S12), the CPU 31B ends the process of the subroutine. When it is determined that another game apparatus 1 is present in the communication range ("YES" in S12), with reference to the specified-location data D8 stored in the game apparatus 1B (S13), the CPU 31B acquires the elapsed-time information included in the specified-location data D8 (S14). Then the CPU 31B generates a terminal beacon frame D1 as shown in FIG. 7A (S15). As the source MAC address included in the terminal beacon frame D1, the MAC address of the game apparatus 1B is written. Note that the MAC address is stored in the wireless communication module 37. As the elapsed-time information included in the terminal beacon frame D1, the elapsed-time information read in step S14 is written.

The CPU 31B transmits the generated terminal beacon frame D1 by broadcast (S16). Then the CPU 31B ends the process of the subroutine.

Figure 11A:
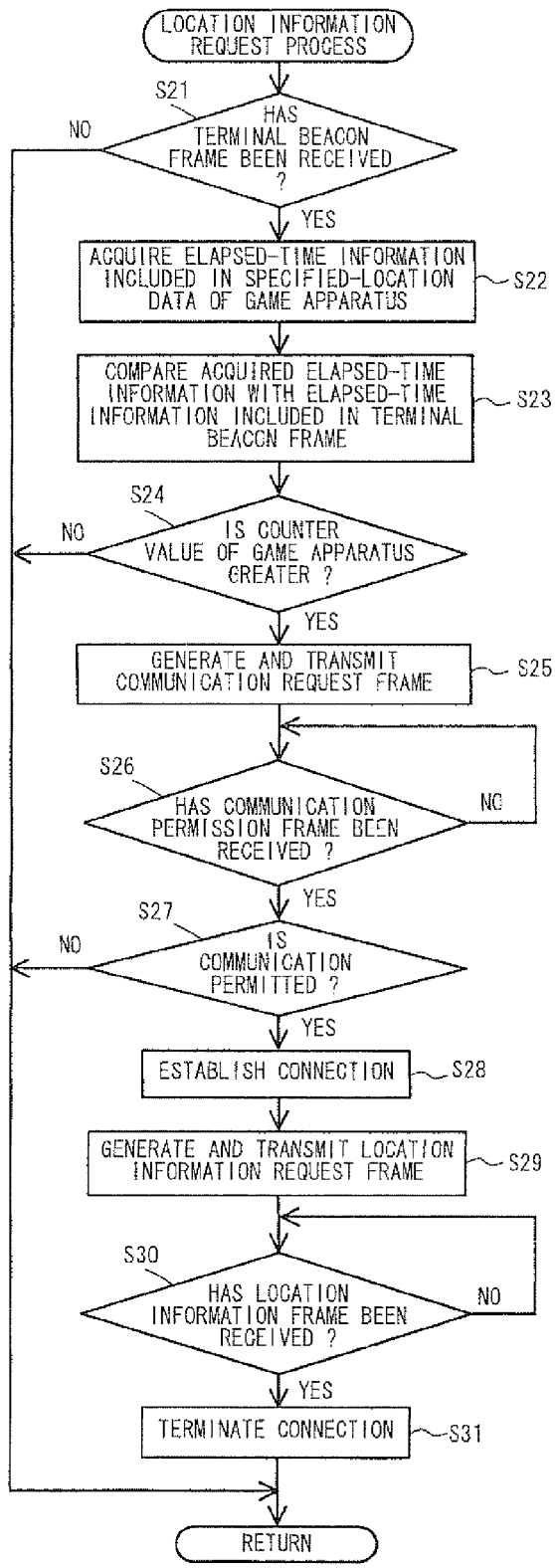
FIG. 11A is a flow chart showing an example of a location information request process performed in step S2 of FIG. 9.

With reference to FIGS. 7A through 7E, 8A, 85, and 11A, a description is given below of the location information request process. FIG. 11A is a flow chart showing an example of the location information request process performed in step S2 of FIG. 9. The location information request process is performed by the CPU 31A of the game apparatus 1A periodically at predetermined time intervals (e.g., 3 seconds).

First, the CPU 31A determines whether or not a terminal beacon frame D1 has been received (S21). This determination is made, for example, based on whether or not a terminal beacon frame D1 is stored in the received-frame storage area 324 (see FIG. 6). When it is determined that a terminal beacon frame D1 has not been received ("NO" in S21), the CPU 31A ends the process of this subroutine. When it is determined that a terminal beacon frame D1 has been received ("YES" in S21), with reference to the specified-location data D8 stored in the data storage area 326 (see FIG. 6), the CPU 31A acquires the elapsed-time information included in the specified-location data D8 (S22).

The CPU 31A compares the read elapsed-time information with the elapsed-time information included in the terminal beacon frame D1 (S23). For example, the CPU 31A compares the pieces of valid time information, i.e., the counter values, included in both pieces of elapsed-time information with each other. As another example, the CPU 31A may compare the pieces of acquisition time information included in both pieces of elapsed-time information with each other.

As a result of the comparison between both pieces of elapsed-time information, if the specified-location data stored in the game apparatus 1A has been acquired less recently than the specified-location data stored in the game apparatus 1B has been ("YES" in S24), the CPU 31A performs the process of step S25. For example, if the counter value included in the specified-location data stored in the game apparatus 1A is greater than the counter value included in the terminal beacon frame D1, the CPU 31A performs the process of step S25. As another example, if the acquisition time information included in the specified-location data stored in the game apparatus 1A is less recent than the acquisition time information included in the terminal beacon frame D1, the CPU 31A performs the process of step S25. On the other hand, if the specified-location data stored in the game apparatus 1A has been acquired more recently than the specified-location data stored in the game apparatus 1B has been ("NO" in S24), the CPU 31A ends the process of the subroutine.

In step S25 the CPU 31A generates a communication request frame D4 as shown in FIG. 7D, and transmits the generated communication request frame D4 to the game apparatus 1B, which is the source of the terminal beacon frame D1. As the source MAC address included in the communication request frame D4, the MAC address of the game apparatus 1A is written, and as the destination MAC address, the source MAC address included in the terminal beacon frame D1 is written.

Although described in detail later, when having received the communication request frame D4, the game apparatus 1B, in response to the communication request frame D4, transmits a communication permission frame D2 to the game apparatus 1A.

The CPU 31A determines, periodically at predetermined time intervals, whether or not the communication permission frame D2 has been received, and repeats the determination until the communication permission frame D2 has been received (S26). This determination is made based on whether or not the communication permission frame D2 is stored in the received-frame storage area 324 (see FIG. 6). With reference to the result information included in the received communication permission frame D2, the CPU 31A determines whether or not communication with the game apparatus 1B is permitted (S27).

When communication with the game apparatus 1B is not permitted ("NO" in S27), the CPU 31A ends the process of the subroutine. When communication with the game apparatus 1B is permitted ("YES" in S27), the CPU 31A registers the game apparatus 1B, which is the source of the communication permission frame D2, as a communication partner, and establishes connection with the game apparatus 1B (S28). Then the CPU 31A generates a location information request frame D5 as shown in FIG. 7E, and transmits the generated location information request frame D5 to the game apparatus 1B (S29). As the destination MAC address included in the location information request frame, the MAC address of the game apparatus 1B, which is a communication partner, is written, and as the source MAC address, the MAC address of the game apparatus 1A is written.

Although described in detail later, when having received the location information request frame D5, the game apparatus 1B, in response to the location information request frame D5, transmits a location information frame D3 to the game apparatus 1A.

The CPU 31A determines, periodically at predetermined time intervals, whether or not the location information frame D3 has been received, and repeats the determination until the location information frame D3 has been received (S30). This determination is made based on whether or not the location information frame D3 is stored in the received-frame storage area 324 (see FIG. 6). After having received the location information frame D3, the CPU 31A performs a process of terminating the connection with the game apparatus 1B (S31). Then the CPU 31A ends the process of the subroutine.

Figure 11B:
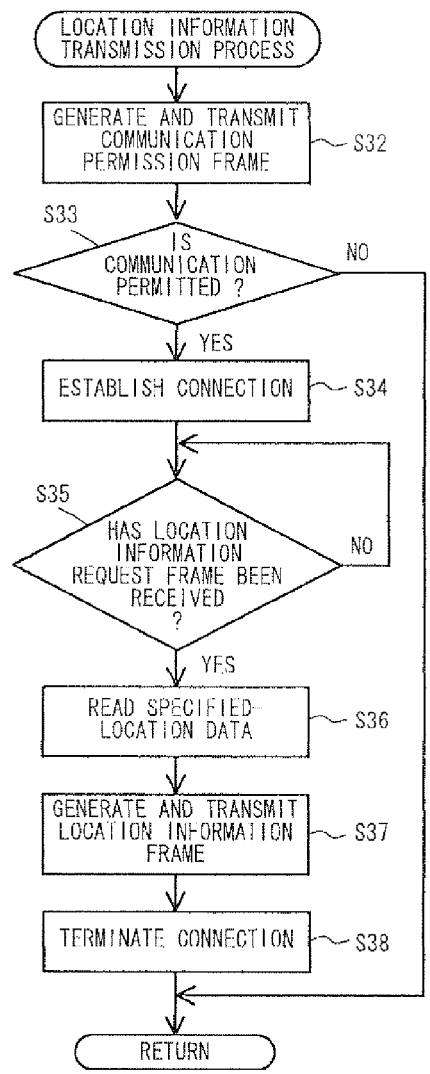
FIG. 11B is a flow chart showing an example of a location information transmission process performed in step S2 of FIG. 9.

With reference to FIGS. 7A through 7E, 8A, 8B, and 11B, a description is given below of the location information transmission process. FIG. 11B is a flow chart showing an example of the location information transmission process performed in step S3 of FIG. 9. The location information transmission process is performed by the CPU 31B of the game apparatus 1B when a communication request frame D4 has been received. The communication request frame D4 is transmitted from the game apparatus 1A in step S25 described above.

First, the CPU 31B determines whether or not communication with the game apparatus 1A is permitted. Then the CPU 31B generates a communication permission frame D2 (see FIG. 7B) so as to include the result information representing the determination result, and transmits the generated communication permission frame D2 to the game apparatus 1A, which is the source of the communication request frame D4 (S32). As the destination MAC address included in the communication permission frame D2, the MAC address of the game apparatus 1A, which is the source of the communication request frame D4, is written. As the source MAC address, the MAC address of the game apparatus 1B is written.

When communication with the game apparatus 1A is not permitted ("NO" in S33), the CPU 31B ends the process of this subroutine. When communication with the game apparatus 1A is permitted ("YES" in S33), the CPU 31B registers the game apparatus 1A, which is the source of the communication request frame D4, as a communication partner, and establishes communication (S34). As described above, when having received the communication permission frame D2, the game apparatus 1A transmits a location information request frame D5 to the game apparatus 1B in step S29 described above. The CPU 31B determines, periodically at predetermined time intervals, whether or not the location information request frame DS has been received (S35). This determination is made based on whether or not the location information request frame D5 is stored in the received-frame storage area 322 (see FIG. 6).

When the location information request frame D5 has been received ("YES" in S35), with reference to the data storage area 326 (see FIG. 6), the CPU 31B reads location data D7 as shown in FIGS. 8A and 8B (S36). The CPU 31B generates a location information frame D3 as shown in FIG. 7C, so as to include the location information, the AP identification information, and the elapsed-time information that are included in the read location data D7, and transmits the generated location information frame D3 to the game apparatus 1A (S37). The destination MAC address included in the location information frame D3 is the MAC address of the game apparatus 1A, and the source MAC address is the MAC address of the game apparatus 1B. Note that the location information frame D3 includes the elapsed-time information included in the location data D7, and therefore the counter value included in the elapsed-time information is taken over by the game apparatus 1A from the game apparatus 1B.

Then the CPU 31B performs a process of terminating the connection with the game apparatus 1A (S38).

With reference to FIGS. 8A through 8D, 12, and 13, a description is given below of the location information specifying process. FIG. 12 is a flow chart (part 1) showing an example of the location information specifying process performed in step S4 of FIG. 9. FIG. 13 is also a flow chart (part 2) showing the example of the location information specifying process performed in step S4 of FIG. 9. The location information specifying process is performed by the CPU 31A of the game apparatus 1A periodically at predetermined time intervals (e.g., every 3 seconds).

First, the CPU 31A determines, with reference to FIG. 12, whether or not the location information frame D3 or an AP beacon frame D6 has been received (S41). The determination of whether or not the location information frame D3 has been received is made based on whether or not the location information frame D3 is stored in the received-frame storage area 324 (see FIG. 6). The determination of whether or not an AP beacon frame D6 has been received is made based on whether or not an AP beacon frame D6 is stored in the received-frame storage area 325 (see FIG. 6).

When it is determined that neither the location information frame D3 nor an AP beacon frame D6 have been received ("NO" in S41), the CPU 31A performs the process of step S51. When it is determined that the location information frame D3 or an AP beacon frame D6 has been received ("YES" in S41), the CPU 31A determines the type of the source of the received frame D3 or D6 (S42). The type of the source indicates the high-reliability access point 2A, the low-reliability access point 2B, or the game apparatus 1B.

When the location information frame D3 has been received, it is determined that the type of the source indicates the game apparatus 1B. When an AP beacon frame D6 has been received, identification is made whether the access point 2 that is the source of the AP beacon frame D6 is the high-reliability access point 2A or the low-reliability access point 2B. The identification is made as follows. The CPU 31A searches the AP identification information table T2 as shown in FIG. 8D, using the ESSID included in the received AP beacon frame D6. As a result, when the AP identification information associated with the ESSID represents a "high-reliability access point", identification is made that the type of the source of the AP beacon frame D6 indicates the high-reliability access point 2A. On the other hand, when the AP identification information associated with the ESSID represents a "low-reliability access point", identification is made that the type of the source of the AP beacon frame D6 indicates the low-reliability access point 2B.

Next, the CPU 31A determines whether or not the type of the source of the frame D3 or D6 indicates the high-reliability access point 2A (S43). When it is determined that the type of the source of the frame D3 or D6 indicates the high-reliability access point 2A ("YES" in S43), the CPU 31A generates location data D7 (AP location data D7a) as shown in FIG. 8A, and stores the generated location data D7 in the data storage area 326 (see FIG. 6) (S44). Note that when the data storage area 326 does not have available space, the CPU 31A may delete a piece of location data D7, among already-stored pieces of location data D7, that has the greatest counter value, i.e., the least recent piece of location data D7, to thereby store a newly generated piece of location data D7.

A description is given of details of the method of generating the AP location data D7a. First, the CPU 31A searches the location information table T1 (see FIG. 8C) using the BSSID included in the AP beacon frame D6, and acquires the location information associated with the BSSID. The CPU 31A also searches the AP identification information table T2 (see FIG. 8D) using the ESSID included in the AP beacon frame D6, and acquires the AP identification information associated with the ESSID. Then the CPU 31A generates AP location data D7a so as to include the acquired location information and AP identification information.

Note that the AP location data D7a is generated so as to also include elapsed-time information, which includes valid time information and acquisition time information. The valid time information is a counter value, to which 1 is added each time step S59 is performed. Thus the greater the counter value, the longer the time since the location information has been acquired from the access point 2. This represents that the valid time is drawing to an end. In addition, the acquisition time information represents the time when the location information has been acquired from the access point 2, i.e., the time when the location information has been acquired from the AP beacon frame D6. The CPU 31A generates the AP location data D7a so as to set the counter value to an initial value (0) and also to set the acquisition time information to the current time.

Next, the CPU 31A determines, with reference to the data storage area 326, whether location information (included in terminal location data D7b) acquired from the game apparatus 1B or location information (included in AP location data D7a) acquired from the low-reliability access point 2B is stored (S45). When it is determined that location information acquired from the game apparatus 1B or location information acquired from the low-reliability access point 2B is not stored ("NO" in S45), the CPU 31A proceeds to the process of step S51.

On the other hand, when it is determined that location information acquired from the game apparatus 1B or location information acquired from the low-reliability access point 2B is stored ("YES" in S45), the CPU 31A deletes from the data storage area 326 location data D7 including the location information about the game apparatus 1B or the low-reliability access point 2B (S46). The reason is that when the location information has been acquired from the high-reliability access point 2A, location information acquired from the low-reliability access point 2B or location information acquired from the game apparatus 1B, i.e., low-reliability location information, is not necessary. Note that in the present embodiment, location information provided by the high-reliability access point 2A is not deleted from the data storage area 326, but may be deleted. This makes it possible to delete from the data storage area 326 location information that is less recent than the location information included in the AP location data D7a generated in step S44. After step S46 is completed, the CPU 31A proceeds to the process of step S51.

A description is given below of the case where it is determined in step S43 that it is "NO", i.e., the case where it is determined that the type of the source of the frame D3 or D6 does not indicate the high-reliability access point 2A.

In this case, the CPU 31A determines whether or not the type of the source of the frame D3 or D6 indicates the game apparatus 1B (S47). When it is determined that the type of the source of the frame D3 or D6 indicates the game apparatus 1B ("YES" in S47), the CPU 31A generates location data D7 (terminal location data D7b) as shown in FIG. 8B, and stores the generated location data D7 in the data storage area 326 (see FIG. 6) (S48). Note that the process performed when the data storage area 326 does not have available space is similar to the method described in step S44, and therefore is not described here.

A description is given of details of the method of generating the terminal location data D7b. First, the CPU 31A generates terminal location data D7b so as to include the location information, the AP identification information, and the elapsed-time information that are included in the location information frame D3. In addition, the terminal location data D7b is generated so as to also include other-game-apparatus-derived information. After the step S48 is completed, the CPU 31A proceeds to the process of step S51.

A description is given below of the case where it is determined in step S47 that it is "NO", i.e., the case where it is determined that the type of the source of the frame D3 or D6 does not indicate the game apparatus 1B.

In this case, the CPU 31A determines whether or not the type of the source of the frame D3 or D6 indicates the low-reliability access point 2B (S49). When it is determined that the type of the source of the frame D3 or D6 indicates the low-reliability access point 2B ("YES" in S49), the CPU 31A generates location data D7 (AP location data D7a), and stores the generated location data D7 in the data storage area 326 (see FIG. 6) (S50). The method of generating the AP location data D7a is similar to the method described in step S44, and therefore is not described here. Then the CPU 31A proceeds to the process of step S51. Note that the process performed when the data storage area 326 does not have available space is also similar to the method described in step S44, and therefore is not described here.

On the other hand, when it is determined that the type of the source of the frame D3 or D6 indicates the low-reliability access point 2B ("NO" in S49), the CPU 31A proceeds to the process of step S51 without storing location information. Note that this applies to, for example, the case where a frame D3 or D6 has been received, whose ESSID is not registered in the AP identification information table T2.

With reference to FIGS. 8A through 8D and FIG. 13, a description is given of step S51 and thereafter of the location information specifying process. The process performed in steps S41 through S50 is a process of acquiring location information based on frames D3 and D7 and storing the acquired location information in the data storage area 326. The process performed in steps S51 through S58 is a process of specifying one of the stored pieces of location information as a piece of location information representing the current location of the game apparatus 1A.

In step S51 the CPU 31A determines, with reference to the data storage area 326, whether or not location data D7 is stored that includes location information acquired from the high-reliability access point 2A. The determination is made, for example, based on whether or not the AP identification information included in location data D7 represents the reliability ranked as a "high-reliability access point".

When location data D7 is stored that includes location information acquired from the high-reliability access point 2A ("YES" in S51), the CPU 31A updates the specified-location data D8 stored in the data storage area 326 so that the location data D7 is the specified-location data D8 representing the current location of the game apparatus 1A (S52). Note that when a plurality of pieces of location data D7 are stored that include pieces of location information acquired from the high-reliability access point 2A, the CPU 31A selects, with reference to the pieces of valid time information (the counter values) included in the plurality of pieces of location data D7, a piece of location data D7 having the smallest counter value, i.e., the most recent piece of location data D7, to be the specified-location data D8. Then the CPU 31A proceeds to the process of step S59.

On the other hand, when location data D7 is not stored that includes location information acquired from the high-reliability access point 2A ("NO" in S51), the CPU 31A determines, with reference to the data storage area 326, whether or not location data D7 (terminal location data D7b) is stored that includes location information acquired from the game apparatus 1B (S53). The determination is made, for example, based on whether or not other-game-apparatus-derived information (see FIG. 8B) is included in location data 87. When terminal location data D7b is stored ("YES" in S53), the CPU 31A determines whether or not equal to or greater than a predetermined number of (e.g., a plurality of) pieces of terminal location data D7b are stored that include pieces of location information whose sources are (which are derived from) the same access point 2 (S54).

Terminal location data D7b includes location information received from the game apparatus 1B. It is, however, an access point 2 that first provides the game apparatus 1B with the location information. The location information is first provided by an access point 2 to the game apparatus 1B, and then is distributed by the game apparatus 1B to the game apparatus 1A directly or via another game apparatus 1B. In step S54 it is determined whether or not equal to or greater than a predetermined number of pieces of location information are stored that are first provided by this same access point 2 (that is the source). The determination is made based on whether or not, in the data storage area 326, equal to or greater than a predetermined number of pieces of terminal location data D7b are stored that include the same AP identification information and the same location information. If the source is the same access point 2, the same AP identification information and the same location information should be included in the pieces of location data.

Note that in the present embodiment, in step S54 it is determined whether or not equal to or greater than a predetermined number of pieces of terminal location data D7b are stored that include the same AP identification information and the same location information; however, it may not be determined whether or not equal to or greater than a predetermined number of pieces of terminal location data D7b are stored that include the same AP identification information, but it may only be determined whether or not equal to or greater than a predetermined number of pieces of terminal location data D7b are stored that include the same location information.

When it is determined that equal to or greater than a predetermined number of pieces of terminal location data D7b are stored that include pieces of location information whose sources are the same access point 2 ("YES" in S54), the CPU 31A specifies one of the pieces of terminal location data D7b as a piece of location information representing the current location of the game apparatus 1A, and updates the specified-location data D8 stored in the data storage area 326 so that the specified piece of terminal location data D7b is the specified-location data D8 (S55). Note that when a plurality of pieces of terminal location data D7b are stored that include pieces of location information whose sources are the same access point 2, the CPU 31A selects, with reference to the pieces of valid time information (the counter values) included in the plurality of pieces of terminal location data D7b, a piece of terminal location data D7b having the smallest counter value to be the specified-location data D8. Then the CPU 31A proceeds to the process of step S59.

Next, a descriptions is given of the case where it is determined that terminal location data D7b is not stored ("NO" in S53) and the case where it is determined that equal to or greater than a predetermined number of pieces of terminal location data D7b are not stored that include pieces of location information whose sources are the same access point 2 ("NO" in S54). In these cases, the CPU 31A performs the process of step S56.

In step S56 the CPU 31A determines, with reference to the data storage area 326, whether or not location data D7 is stored that includes location information provided by the low-reliability access point 2B (S56). When it is determined that location data D7 is not stored that includes location information provided by the low-reliability access point 25 ("NO" in S56), the CPU 31A proceeds to the process of step S59. On the other hand, when it is determined that location data D7 is stored that includes location information provided by the low-reliability access point 2B ("YES" in S56), the CPU 31A determines whether or not equal to or greater than a predetermined number of (e.g., a plurality of) pieces of location data D7 are stored that include pieces of location information provided by the same access point 2 (S57). Note that based on whether or not the same location information is included, it is determined whether or not the pieces of location data D7 include pieces of location information provided by the same access point 2.

When it is determined that equal to or greater than a predetermined number of (e.g., a plurality of) pieces of location data D7 are stored that include pieces of location information received from the same access point 2 ("YES" in S57), the CPU 31A updates the specified-location data D8 stored in the data storage area 326 so that one of the pieces of location data D7 is the specified-location data D8 representing the current location of the game apparatus 1A (S58). Note that when a plurality of pieces of location data D7 are stored that include pieces of location information whose sources are the same access point 2, the CPU 31A selects, with reference to the pieces of valid time information (the counter values) included in the plurality of pieces of location data D7, a piece of location data D7 having the smallest counter value to be the specified-location data D8. Then the CPU 31A proceeds to the process of step S59.

Note that when it is determined that location data D7 is not stored that includes location information acquired from the low-reliability access point 2B ("NO" in S56), or when equal to or greater than a predetermined number of pieces of location data D7 are not stored that include pieces of location information whose sources are the same access point 2 ("NO" in S57), the CPU 31A performs the process of step S59 without performing the process of updating the specified-location data D8.

As described above, in the present embodiment, in steps S51 through S58 it is possible to determine the specified-location data D8, using, on a priority basis, location data D7 that is presumed to have a high reliability (presumed to be unlikely to be incorrect). Thus it is possible to improve the accuracy of specified-location information representing the current location of the game apparatus 1A. Note that in the present embodiment, pieces of location information are prioritized based on reliabilities in order of location information provided by the high-reliability access point, location information provided by the game apparatus 1B, and location information provided by the low-reliability access point.

When specified-location information is determined using location information acquired from the game apparatus 1B or location information acquired from the low-reliability access point 2B, location information is specified using a plurality of pieces of location information whose sources are the same access point 2. This makes it possible to improve the accuracy of specified-location information representing the current location of the game apparatus 1A even when location information is used that has a lower reliability than that of location information acquired from the high-reliability access point 2A. Note that, as described above, in the present embodiment, if it is impossible to specify location information using a plurality of pieces of location information whose sources are the same access point 2, specified-location information is not specified.

Next, the process of step S59 is described. This process is a process of managing how recently location information has been acquired from the access point 2. In step S59 the CPU 31A adds a predetermined value (e.g., 1) to the pieces of valid time information (the counter values) included in all the pieces of location data D7 and all the pieces of specified-location data D8 that are stored in the data storage area 326. This causes the counter values to increase by a predetermined value each time the process of step S59 is performed, and thus it is possible to manage the valid time of location information based on the magnitude of the counter value. The greater the counter value, the less recently the location information has been acquired from the access point 2.

Then, with reference to the counter values of all the pieces of location data D7 stored in the data storage area 326, the CPU 31A deletes (invalidates) location data D7 whose counter value has reached a predetermined value (e.g., 600) (S60). This makes it possible to discard location data D7 whose valid time is drawing to an end because a long time has elapsed since the location data D7 has been acquired. Thus it is possible to prevent the case where the specified-location data D8 is updated using old location data D7 to thereby specify location information representing an inaccurate current location. The reason is that since the game apparatus 1A is a hand-held apparatus that travels while carried by the user, it is presumed that if a long time has elapsed since location information has been acquired, the location information is likely to represent a different location from the current location of the game apparatus 1A.

Then the CPU 31A ends the process of the subroutine. Note that in FIGS. 9 through 13, a process is shown that is performed in the case where the game apparatus 1A acquires location information from the game apparatus 1B, and determines specified-location information representing the current location of the game apparatus 1A based on the acquired location information or location information provided by an access point 2. However, in the case where the game apparatus 1A distributes location information to the game apparatus 1B, the game apparatus 1A performs the processes the terminal beacon transmission process and the location information transmission process) described as those of the game apparatus 1B.

As described above, in the present embodiment, even when the game apparatus 1A is located out of the communication ranges of all the access points 2, the game apparatus 1A can be provided with location information by wirelessly communicating with the game apparatus 1B. This makes it possible to expand the range where the game apparatus 1A can be provided with location information to the range where the game apparatus 1A is so located as to communicate with the game apparatus 1B, as well as such a limited range where the game apparatus 1A is located in the accessible range of radio wave of an access point 2. In addition, the number of game apparatuses 1B with which the game apparatus 1A can communicate will increase with the proliferation of the apparatus, and therefore it is possible, with the proliferation of the apparatus, to further expand the range where the game apparatus 1A can be provided with location information.

Further, the game apparatus 1B travels while carried by the user of the game apparatus 1B, and is not provided in a fixed manner. Thus the region where the game apparatus 1A can acquire location information changes in a fluid manner, and therefore it is possible to add variety to the state where the game apparatus 1A can be provided with location information.

(Second Embodiment)

Figure 14:
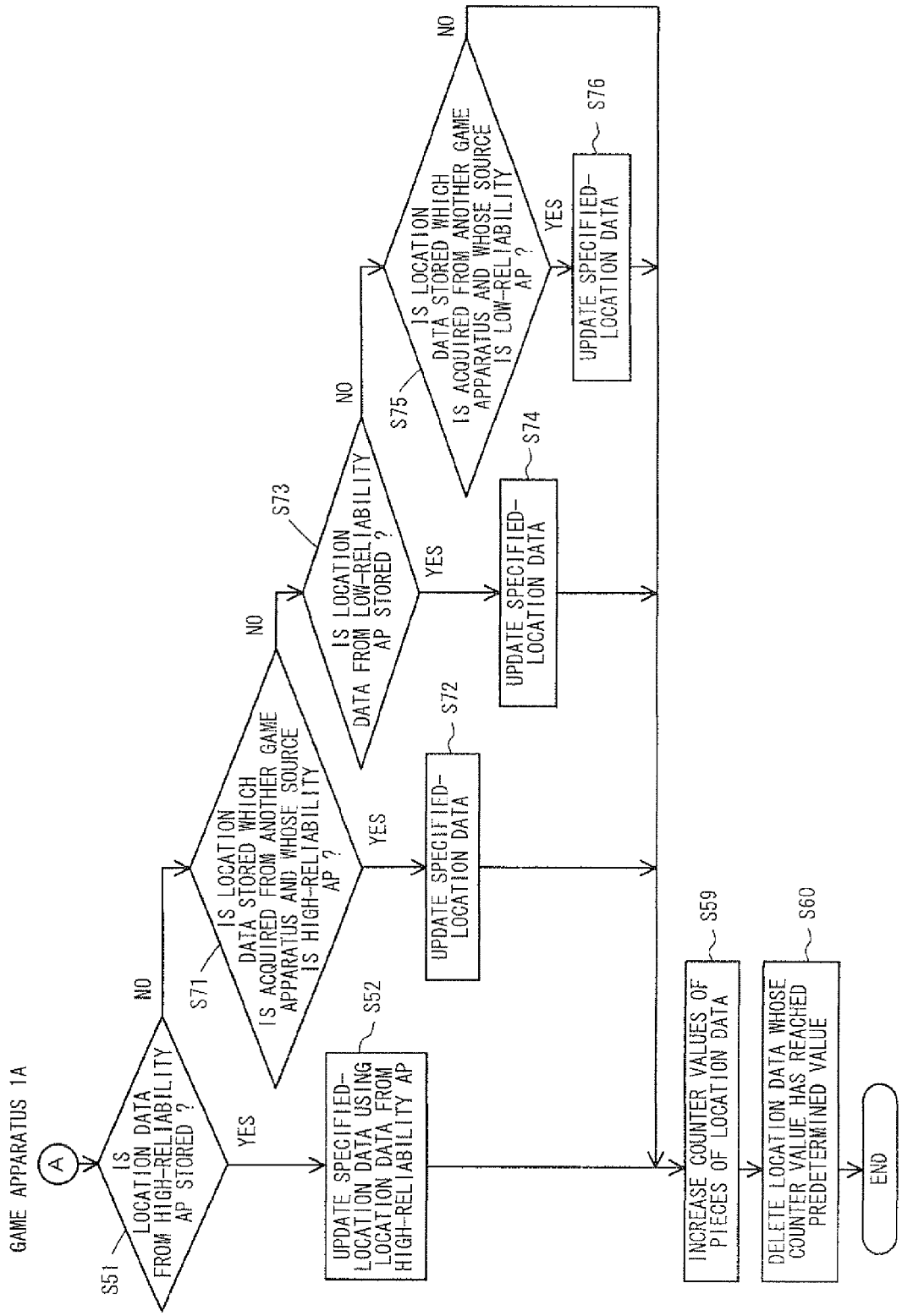
FIG. 14 is a flow chart showing a location information specifying process according to a second embodiment.

With reference to FIGS. 12 and 14, a description is given of a location information provision system according to a second embodiment of the present invention. The location information provision system according to the second embodiment is referred to as a "location information provision system 100A" so as to be distinguished from the location information provision system 100 according to the first embodiment. The location information provision system 100A is different from that of the first embodiment only in location information specifying process, and the other processes are the same as those of the first embodiment. Thus only the location information specifying process according to the second embodiment is described, and therefore other features are not described below.

The location information specifying process according to the second embodiment is characterized in that pieces of location information acquired from the game apparatus 1B are prioritized in accordance with the reliability ranks (a high-reliability access point or a low-reliability access point) of the access points 2 that are the sources of the corresponding pieces of location information. With these priorities taken into account, pieces of location information in the second embodiment are prioritized as follows:

(i) location information provided by the high-reliability access point 2A
(ii) location information which is acquired from the game apparatus 1B and whose source is the high-reliability access point 2A
(iii) location information provided by the low-reliability access point 2B
(iv) location information which is acquired from the game apparatus 1B and whose source is the low-reliability access point 2B A description is given below of the location information specifying process according to the second embodiment. In the location information specifying process according to the second embodiment, the process performed in steps S41 through S50 is the same as that described with reference to FIG. 12 in the first embodiment, and therefore is not described below. The process in step S51 and thereafter is described with reference to FIG. 14.

FIG. 14 is a flow chart showing the location information specifying process according to the second embodiment. In the flow chart, steps in which the same process as that of the first embodiment is performed are denoted by the same numerals, while steps in which a different process from that of the first embodiment is performed are denoted by different numerals. Only the different process from that of the first embodiment is described, and the same process is not described below.

When it is "NO" in S51, i.e., when location data D7 is not stored that includes location information acquired from the high-reliability access point 2A, the CPU 31A of the game apparatus 1A determines, with reference to the data storage area 326, whether or not location data D7 (terminal location data D7b) is stored that includes location information which is acquired from the game apparatus 1B and whose source is the high-reliability access point 2A (S71).

When location data D7 (terminal location data D7b) is stored that includes location information which is acquired from the game apparatus 1B and whose source is the high-reliability access point 2A ("YES" in S71), the CPU 31A updates the specified-location data D8 stored in the data storage area 326 so that the location data D7 is the specified-location data D8 (S72). Note that when a plurality of pieces of terminal location data D7b are stored that include pieces of location information which are acquired from the game apparatus 1B and whose sources are the high-reliability access point 2A, the CPU 31A selects, with reference to the pieces of valid time information (the counter values) included in the plurality of pieces of terminal location data D7b, apiece of terminal location data D7b having the smallest counter value, i.e., the most recent piece of terminal location data D7b, to be the specified-location data D8. Then the CPU 31A performs the process of step S59.

On the other hand, when location data D7 (terminal location data D7b) is not stored that includes location information which is acquired from the game apparatus 1B and whose source is the high-reliability access point 2A ("NO" in S71), the CPU 31A determines whether or not location data D7 is stored that includes including location information provided by the low-reliability access point 2B (S73). When location data D7 is stored that includes location information provided by the low-reliability access point 2B ("YES" in S73), the CPU 31A updates the specified-location data D8 stored in the data storage area 326 so that the location data D7 is the specified-location data D8 (S74). Note that the process performed in the case where a plurality of pieces of terminal location data D7b are stored that include pieces of location information provided by the low-reliability access point 2B, is the same as that described in step S72. Then the CPU 31A performs the process of step S59.

On the other hand, when location data D7 is not stored that includes location information acquired from the low-reliability access point 25 ("NO" in S73), the CPU 31A determines whether or not location data D7 (terminal location data D7b) is stored that includes location information which is acquired from the game apparatus 1B and whose source is the low-reliability access point 2B (S75). When terminal location data D7b is stored that includes location information which is acquired from the game apparatus 1B and whose source is the low-reliability access point 2B ("YES" in S75), the CPU 31A updates the specified-location data D8 stored in the data storage area 326 so that the location data D7 is the specified-location data D8 (S76). Note that the process performed in the case where a plurality of pieces of terminal location data D7b are stored that include pieces of location information which are acquired from the game apparatus 1B and whose sources are the low-reliability access point 2B, is the same as that described in step S72. Then the CPU 31A performs the process of step S59.

When location data D7 (terminal location data D7b) is not stored that includes location information which is acquired from the game apparatus 1B and whose source is the low-reliability access point 2B ("NO" in S75), the CPU 31A performs the process of step S59 without performing the process of updating the specified-location data D8.

As described above, in the second embodiment, pieces of location information acquired from the game apparatus 1B are prioritized in accordance with the reliability ranks (a "high-reliability access point" or a "low-reliability access point") of the access points 2 that are the sources of the corresponding pieces of location information. Thus it is possible to determine a piece of specified-location information representing the current location of the game apparatus 1A, using, among pieces of location information acquired from the game apparatus 1B, a piece of location information having a higher reliability than that of another.

(Third Embodiment)

Figure 15:
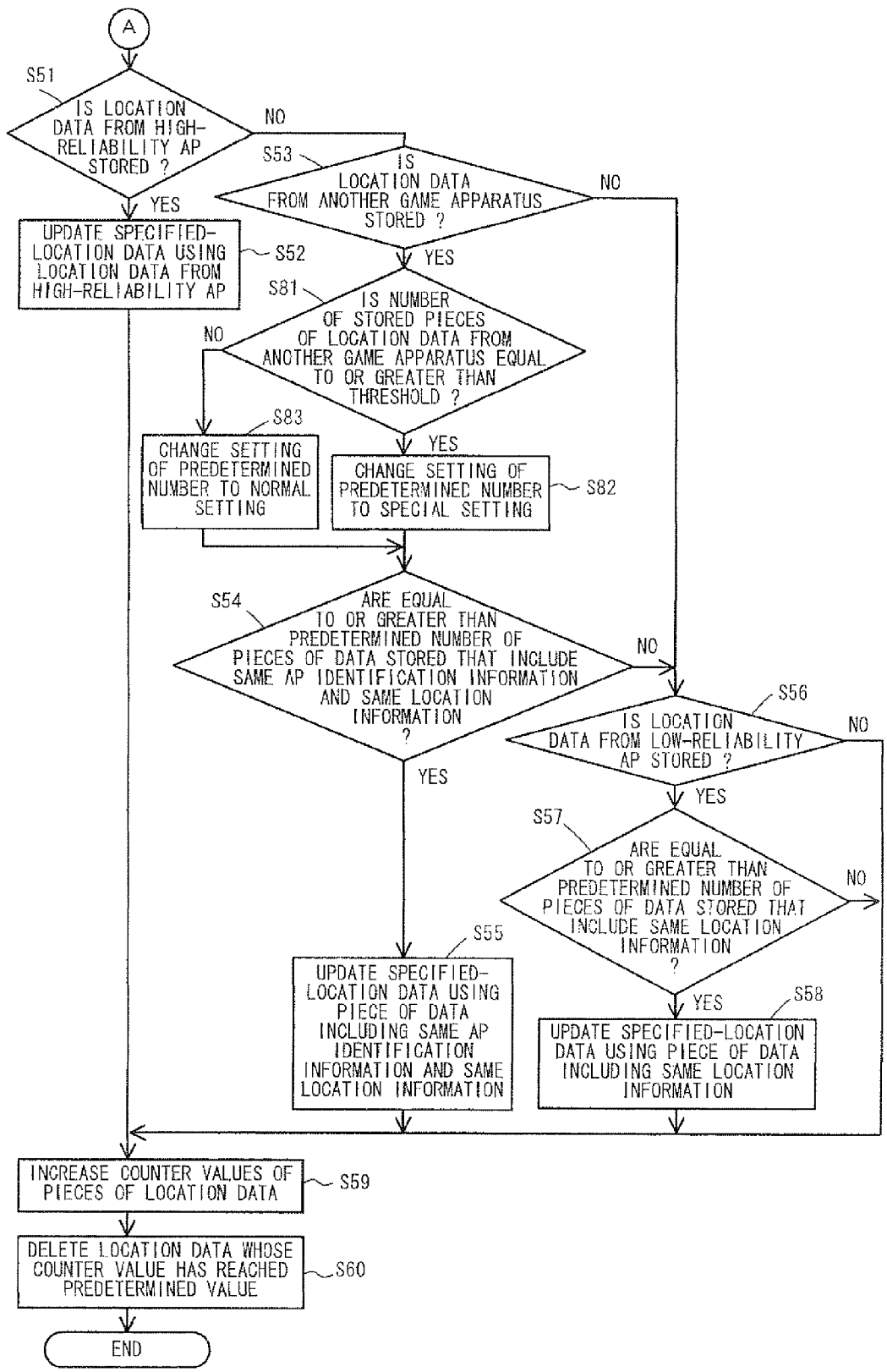
FIG. 15 is a flow chart showing a location information specifying process according to a third embodiment.

With reference to FIGS. 12, 13, and 15, a description is given of a location information provision system according to a third embodiment of the present invention. The location information provision system according to the third embodiment is referred to as a "location information provision system 100B" so as to be distinguished from the location information provision system 100 according to the first embodiment. The location information provision system 100E is different from that of the first embodiment only in location information specifying process, and the other processes are the same as those of the first embodiment. Thus only the location information specifying process according to the third embodiment is described, and therefore other features are not described below.

In the location information specifying process according to the first embodiment, in step S54 of FIG. 13 it is determined whether or not equal to or greater than a predetermined number of pieces of terminal location data D7b are stored that include pieces of location information whose sources are the same access point 2. The location information specifying process according to the third embodiment is characterized in that in accordance with the number of times pieces of location information have been acquired from the game apparatus 1B for a given period of time, the setting of the predetermined number used in the determination of step S54 is changed from a normal setting to a special setting, whose number is greater than that of the normal setting. This change to the special setting is made so as to increase the predetermined number used in the determination of step S54, to thereby specify location information with increased reliability.

A description is given below of the location information specifying process according to the third embodiment. In the location information specifying process according to the third embodiment, the process performed in steps S41 through S50 is the same as that described with reference to FIG. 12 in the first embodiment, and therefore is not described below. The process in step S51 and thereafter is described with reference to FIG. 15.

FIG. 15 is a flow chart showing the location information specifying process according to the third embodiment. In the flow chart, steps in which the same process as that of the first embodiment is performed are denoted by the same numerals, while steps in which a different process from that of the first embodiment is performed are denoted by different numerals. Only the different process from that of the first embodiment is described, and the same process is not described below.

When it is determined in step S53 that it is "YES", i.e., when location data D7 (terminal location data D7b) is stored that includes location information acquired from the game apparatus 1B ("YES" in S53), the CPU 31A determines whether or not the number of the stored pieces of terminal location data D7b is equal to or greater than a threshold (S81). When the number of the stored pieces of terminal location data D7b is equal to or greater than the threshold ("YES" in S81), the CPU 31A changes the predetermined number used in the determination in step S54 from that of the normal setting (e.g., two) to that of the special setting (e.g., three) (S82). For example, the CPU 31A stores two types of values of the predetermined number in the data storage area 326, so as to change the setting of the predetermined number to the greater value. Note that when the setting of the predetermined number is already the special setting, the process of changing the setting of the predetermined number is not performed. Then the CPU 31A proceeds to the process of step S54.

When the number of the stored pieces of terminal location data D7b including pieces of location information acquired from the game apparatus 1B is smaller than the threshold ("NO" in S81), the CPU 31A changes the setting of the predetermined number used in the determination in step S54 to the normal setting (S83). For example, the CPU 31A sets the predetermined value to, among a plurality of types of (e.g., two types of) values of the predetermined number stored in the data storage area 326, the smaller value. Note that when the setting of the predetermined value is already the normal setting, the process of changing the setting of the predetermined number is not performed. Then the CPU 31A proceeds to the process of step S54.

As described above, in the third embodiment, in accordance with the number of pieces of terminal location data D7b stored in the game apparatus 1A, the setting of the predetermined number used in the determination in step S54 is changed. Specifically, when the number of the stored pieces of terminal location data D7b is smaller than the threshold, the setting of the predetermined number is set to the normal setting. When the number of the stored pieces of terminal location data D7b is equal to or greater than the threshold, the setting of the predetermined number is set to the special setting. Thus, in the case where the number of the stored pieces of terminal location data D7b is equal to or greater than the threshold, a greater number of pieces of terminal location data D7b need to be stored than the case where the number of the stored pieces of terminal location data D7b is smaller than the threshold, so that it is determined in step S54 that it is "YES". The reason is explained below. The more the pieces of terminal location data D7b whose sources are the same access point 2 are stored, the higher the reliabilities of the pieces of location information represented by the pieces of terminal location data D7b are presumed to be. Thus in the third embodiment, when the number of the stored pieces of terminal location data D7b is great to some extent (is equal to or greater than the threshold), the setting of the predetermined number used in the determination in step S54 is changed to the special setting, whose number is greater than that of the normal setting, so that it is possible to specify location information with increased reliability.

On the other hand, when the number of the stored pieces of terminal location data D7b is smaller than the threshold, if the predetermined number used in the determination in step S54 is increased too much, it becomes impossible to specify location information. Thus, in this case, the setting of the predetermined number is set to the normal setting.

Note that in the third embodiment, one threshold is used in the determination in step S81; however, a plurality of types of thresholds may be used so that the setting of the predetermined number used in the determination in step S54 is changed among a plurality of types of values. Note that the predetermined number used in the determination in step S57 is not variable, but may be made variable with the same process as that of steps S81 through S83 performed.

Note that in the third embodiment, it is determined in step S81 whether or not the number of the stored pieces of terminal location data D7b is equal to or greater than the threshold. This is a method of determining the number of times pieces of location information have been acquired from the game apparatus 1B for a given period of time. Since location data D7 stored in the data storage area 326 is deleted if the counter value has reached a predetermined value (S60), the number of the stored pieces of location data D7 corresponds to the number of times pieces of location information have been acquired from the game apparatus 1B for a given period of time. Another method may be used to determine the number of times pieces of location information have been acquired from the game apparatus 1B for a given period of time.

(Fourth Embodiment)

With reference to FIGS. 7F, 8C, 8D, and 16, a description is given of a location information provision system according to a fourth embodiment of the present invention. The location information provision system according to the fourth embodiment is referred to as a "location information provision system 100C" so as to be distinguished from the location information provision system 100 according to the first embodiment.

Figure 16:
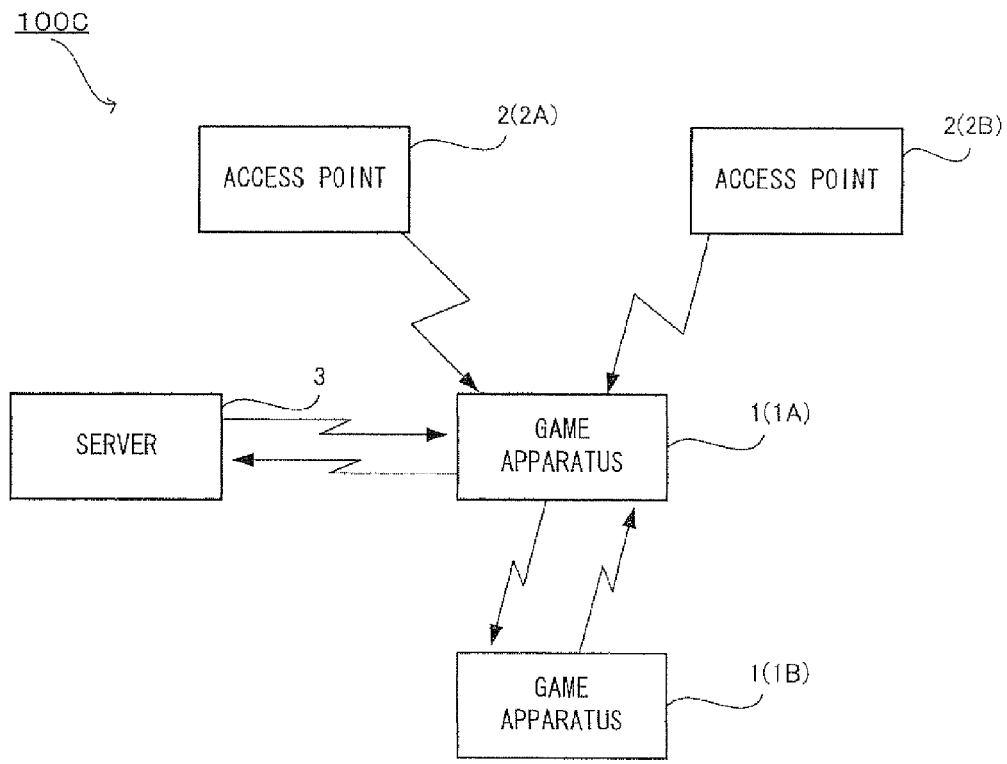
FIG. 16 is a diagram showing the structure of a location information provision system according to a fourth embodiment.

FIG. 16 is a diagram showing the structure of the location information provision system 100C according to the fourth embodiment. The location information provision system 100C includes a plurality of game apparatuses 1, a plurality of access points 2, and a server 3. In the location information provision system 100C, the game apparatuses 1 can wirelessly communicate with the access points 2 and the server 3 in compliance with the IEEE 802.11 wireless LAN standard. The game apparatuses 1 (1A, 1B) can wirelessly communicate with each other by a predetermined communication method.

The features of the fourth embodiment are described below. When having received an AP beacon frame D6 as shown in FIG. 7F, the game apparatus 1A generates inquiry information so as to include the ESSID and the BSSID that are included in the AP beacon frame D6, and transmits the generated inquiry information to the server 3. The server 3 has stored therein tables T1 and T2 as shown in FIGS. 8C and 8D, respectively. Note that in the fourth embodiment, the game apparatus 1 does not have stored therein tables T1 and T2. The server 3 searches the AP identification information table T2 using the ESSID included in the received inquiry information, and searches the location information table T1 using the BSSID. When having acquired the AP identification information and the location information as a result of the searches, the server generates a frame so as to include the AP identification information and the location information, and transmits the generated frame to the game apparatus 1A. The game apparatus 1A generates location data D7 using the information included in the frame received from the server. The other components of the location information provision system 100C and the other features of the process performed in the location information provision system 100C are the same as those of the first embodiment, and therefore are not described here.

Figure 17:
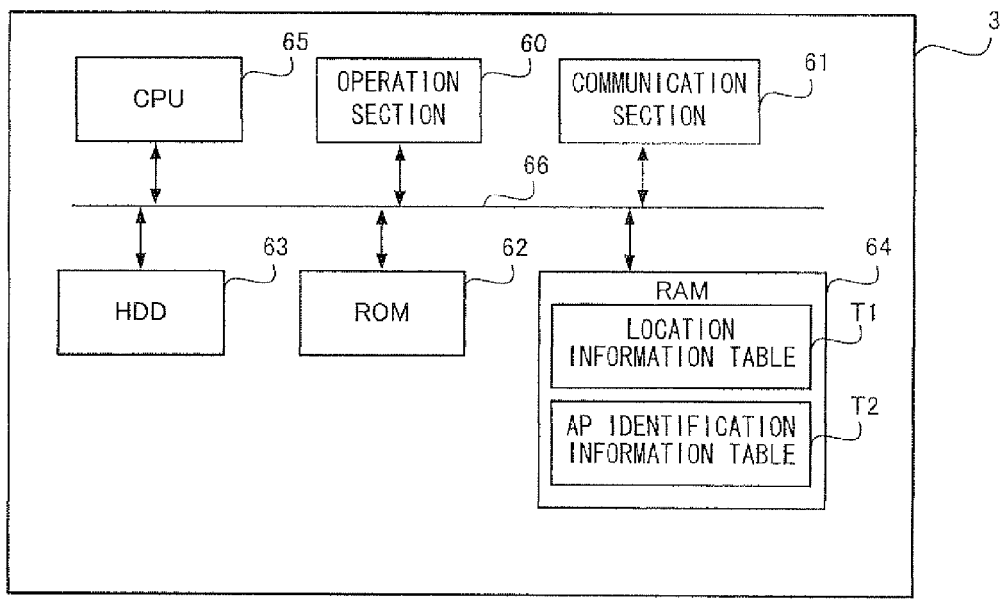
FIG. 17 is a block diagram showing the internal structure of a server according to the fourth embodiment.

With reference to FIG. 17, the structure of the server 3 is described. FIG. 17 is a block diagram showing the internal structure of the server 3 according to the fourth embodiment.

The server 3 includes an operation section 60, a communication section 61, a ROM 62, an HDD 63, a RAM 64, an a CPU 65, which are connected to one another via a bus 66 so as to communicate with one another.

The operation section 60 has the function of receiving an operation from an administrator of the server 3. The communication section 61 has the function of establishing connection with a wireless LAN by, for example, a method complying with the IEEE 802.11b/g standard. The ROM 62 has stored therein a system program that starts up the server 3 and performs basic functions. The HDD 63 has stored therein a program including a communication program that causes the server 3 to communicate with the game apparatus 1, and also including data that is necessary for the execution of the program. The data includes a location information table T1 as shown in FIG. 8C and an AP identification information table T2 as shown in FIG. 8D. The RAM 64 functions as a work area of the CPU 65, and stores therein the tables T1 and T2 that are read from the HOD 63.

The CPU 65 performs the above process of transmitting location information about an access point 2 to the game apparatus 1A in accordance with an inquiry from the game apparatus 1A.

As described above, in the fourth embodiment, the server 3 has stored therein the tables T1 and T2 so that the game apparatus 1A makes an inquiry to the server 3, and therefore can acquire location information. Thus in the fourth embodiment, there is the advantage that it is possible to update the tables T1 and T2 more easily as compared to the case where the game apparatus 1A has stored therein the tables T1 and T2.

Next, variations of the first through fourth embodiments are described below.

(1) In the first through fourth embodiments, in the priorities set based on reliabilities, location information provided by the high-reliability access point 2A is always ranked higher than location information provided by the game apparatus 1B and location information provided by the low-reliability access point 2B; however, the present invention is not limited to this. Only when the time elapsed since location information has been provided by the high-reliability access point 2A is smaller than a predetermined value (i.e., when location information has been provided more recently than a predetermined point in elapsed time), the priority of the location information may be raised. This method may be performed as follows, for example. In the process of FIGS. 13 through 15, when it is determined in step S51 that it is "YES", i.e., when location data D7 is stored that includes location information acquired from the high-reliability access point 2A, it is determined whether or not the time elapsed since the location data D7 has been provided by the high-reliability access point 2A is smaller than a predetermined value. The determination is made using elapsed-time information. Then, only when it is determined that it is "YES", the process of step S52 is performed so that the location data D7 is set as the specified-location data D8 representing the current location of the game apparatus 1A. On the other hand, when it is determined that it is "NO", the location data D7 is not set as the specified-location data D8, and the process of step S53 or S71 is performed.

Note that similarly, location information provided by the game apparatus 1B may also be prioritized in relation to location information provided by the low-reliability access point 2B, taking into account the elapsed-time information about the location information provided by the game apparatus 1B.

(2) In the first and third embodiments, in steps S54 and S57 of the location information specifying process, the number of the stored pieces of location data D7 including completely the same location information is determined; however, the pieces of location information may not need to be completely the same but may only need to approximate each other. For example, when location information is latitude/longitude information, if the latitudes and longitudes represented by pieces of location information have only errors within predetermined values, it is determined that the pieces of location information approximate each other. In this case, a plurality of pieces of location information are present that can be specified-location information. Accordingly, for example, a piece of location data D7 having the smallest counter value, i.e., the most recent piece of location data D7, may be selected to be the specified-location data D8. Note that in this variation, it is not taken into account whether or not the access points 2 that are the sources are the same, and therefore it is not necessary to determine whether or not the pieces of AP identification information are the same.

(3) In the first through fourth embodiments, when the game apparatus 1B transmits location information to the game apparatus 1A, the counter value counted in the game apparatus 1B is taken over by the game apparatus 1A; however, the present invention is not limited to this. That is, a counter value is included in location information frame D3 (see FIG. 7C) and is transmitted, but may not be included. In this variation, counting is newly started when the game apparatus 1A has acquired location information from the game apparatus 1B.

(4) In the first through fourth embodiments, only when the game apparatuses 1A and 1B are each set to the "passing communication mode", the game apparatuses 1A and 1B transmit and receive location information to and from each other; however, the present invention is not limited to this. That is, if the game apparatuses 1A and 1B are powered on, or if the game apparatuses 1A and 1B are powered on and satisfy predetermined conditions, the game apparatuses 1A and 1B may be able to transmit and receive location information to and from each other. Alternatively, when the users each perform a predetermined operation, the game apparatuses 1A and 1B may transmit and receive location information to and from each other.

(5) In the first through fourth embodiments, the mobile terminal device according to the present invention is applied to the game apparatus 1; however, the present invention is not limited to a game apparatus. The present invention is applicable to, for example, a mobile phone, a personal handyphone system (PHS), and a personal digital assistant (PDA).

(6) Note that the game apparatus 1A does not need to be provided with location information by an access point 2, and may be provided with location information by a fixed station (e.g., a stationary game apparatus or a personal computer) that is provided in a fixed manner. Alternatively, the game apparatus 1A and only the game apparatus 1B may provide location information with each other.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein a mobile terminal program causing a computer of a mobile terminal device to:

communicate with another mobile terminal device and acquire first location information representing a location of the other mobile terminal device from the other mobile terminal device through the communication; and causing the mobile terminal device to specify a current location of the mobile terminal device based on the first location information acquired from the other mobile terminal device.

2. The non-transitory computer-readable storage medium having stored therein the mobile terminal program according to claim 1, the program further causing the computer of the mobile terminal device to acquire second location information related to the current location of the mobile terminal device, and specify the current location of the mobile terminal device based on the first location information and/or the second location information.

3. The non-transitory computer-readable storage medium having stored therein the mobile terminal program according to claim 2, the program further causing the computer of the mobile terminal device to communicate with a fixed station that is provided in a fixed manner, and acquire information representing a location of the fixed station, as the second location information.

4. The non-transitory computer-readable storage medium having stored therein the mobile terminal program according to claim 3, wherein the other mobile terminal device communicates with the fixed station or another fixed station to thereby acquire location information, and the mobile terminal device acquires the location information from the other mobile terminal device as the first location information.

5. The non-transitory computer-readable storage medium having stored therein the mobile terminal program according to claim 3, wherein, when the mobile terminal device has acquired the second location information, the current location of the mobile terminal device is specified based on the second location information acquired, regardless of whether or not the first location information has been acquired.

6. The non-transitory computer-readable storage medium having stored therein the mobile terminal program according to claim 5, wherein, when the second location information has not been acquired and when the first location information has been acquired, the current location of the mobile terminal device is specified based on the first location information.

7. The non-transitory computer-readable storage medium having stored therein the mobile terminal program according to claim 3, the program causing the computer of the terminal device to:

determine a time elapsed since the first location information was acquired and/or time elapsed since the second location information was acquired; and invalidate the first location information if the determined time for the first location information has reached a predetermined time period; and invalidate the second location information if the determined time for the second location information has reached a predetermined time period.

8. The non-transitory computer-readable storage medium having stored therein the mobile terminal program according to claim 3, wherein the acquired first location information is stored in the mobile terminal device for a predetermined period of time, and the current location of the mobile terminal device is specified based on one of the first location information satisfying predetermined conditions including a condition that the number of pieces of the first location information stored is equal to or greater than a predetermined number, and the second location information.

9. The computer-readable storage medium having stored therein the mobile terminal program according to claim 8, the program further causing the computer to change the predetermined number.

10. The computer-readable storage medium having stored therein the mobile terminal program according to claim 9, the program further causing the computer of the mobile terminal device to store the number of times the first location information has been acquired from the other mobile terminal device, and change the predetermined number based on the number of times the first location information has been stored.

11. The computer-readable storage medium having stored therein the mobile terminal program according to claim 3, wherein the fixed station is an access point.

12. The computer-readable storage medium having stored therein the mobile terminal program according to claim 2, wherein the second location information is automatically acquired from the other mobile terminal device.

13. The computer-readable storage medium having stored therein the mobile terminal program according to claim 1, wherein the mobile terminal device communicates with the mobile terminal device by Near Field Communication.

14. The computer-readable storage medium having stored therein the mobile terminal program according to claim 1, wherein the first location information is automatically acquired from the other mobile terminal device.

15. A system, including a mobile terminal device, for specifying a current location of the mobile terminal device, the system comprising:

a first communication unit that communicates with another mobile terminal device;

first location information acquisition unit that communicates with the other mobile terminal device using the first communication unit to thereby acquire first location information representing a location of the other mobile terminal device from the other mobile terminal device; and a current location specifying unit on the mobile terminal device that specifies the current location of the mobile terminal device based on the first location information.

16. A method of specifying a current location of a mobile terminal device, the method comprising the steps of:

communicating with another mobile terminal device to thereby acquire first location information representing a location of the other mobile terminal device from the other mobile terminal device; and specifying, by the mobile terminal device, the current location of the mobile terminal device based on the first location information.

17. A system including a fixed station provided in a fixed manner, a first mobile terminal device, and a second mobile terminal device, the fixed station comprising:

first storage means for storing therein information for specifying a current location of the fixed station; and first transmission means for transmitting the stored information to the first mobile terminal device, the first mobile terminal device comprising:

first reception means for receiving the information transmitted from the first transmission means;

fixed station location specifying means for specifying a location of the fixed station based on the information received by the first reception means; and second transmission means for transmitting, to the second mobile terminal device, location information representing the location specified by the fixed station location specifying means, and the second mobile terminal device comprising:
  second reception means for receiving the location information transmitted from the second transmission means; and
  current location specifying means for specifying a current location of the second mobile terminal device based on the location information received by the second reception means.

18. The system according to claim 17, wherein
the information for specifying the current location of the fixed station includes identification information specific to the fixed station;
the first mobile terminal device further comprises second storage means for storing therein location information associated with the identification information; and
the fixed station location specifying means reads from the second storage means the location information associated with the identification information included in the information received by the first reception means, and specifies the location of the fixed station based on the read location information.

19. The system according to claim 17, wherein
the information for specifying the current location of the fixed station includes identification information specific to the fixed station;
the first mobile terminal device further comprises second storage unit for storing therein location information associated with the identification information; and
the fixed station location specifying unit reads from the second storage unit the location information associated with the identification information included in the information received by the first reception unit, and specifies the location of the fixed station based on the read location information.

20. A system including a fixed station provided in a fixed manner, a first mobile terminal device, and a second mobile terminal device, the fixed station comprising:
  first storage unit for storing therein information for specifying a current location of the fixed station; and
  first transmission unit for transmitting the stored information to the first mobile terminal device, the first mobile terminal device comprising:
  first reception unit for receiving the information transmitted from the first transmission unit;
  fixed station location specifying unit that specifies a location of the fixed station based on the information received by the first reception unit; and
  second transmission unit transmits, to the second mobile terminal device, location information representing the location specified by the fixed station location specifying unit, and the second mobile terminal device comprising:
  second reception unit for receiving the location information transmitted from the second transmission unit; and
  current location specifying unit that specifies a current location of the second mobile terminal device based on the location information received by the second reception unit.

\* \* \* \* \*